United States Patent [19]

Saito et al.

[11] Patent Number: 4,692,773
[45] Date of Patent: Sep. 8, 1987

[54] IMAGE FORMING METHOD USING IMAGE FORMING ELEMENTS HAVING DIFFERENT CONCENTRATIONS AND PITCHES

[75] Inventors: Asao Saito, Fujisawa; Kunio Watanabe, Kawasaki, both of Japan

[73] Assignee: Canon Kabushiki Kaisha, Tokyo, Japan

[21] Appl. No.: 815,677

[22] Filed: Jan. 2, 1986

Related U.S. Application Data

[63] Continuation of Ser. No. 514,622, Jul. 18, 1983, abandoned.

[30] Foreign Application Priority Data

Jul. 23, 1982 [JP] Japan ................................ 57-128567
Jul. 23, 1982 [JP] Japan ................................ 57-128568
Jul. 23, 1982 [JP] Japan ................................ 57-128569
Jul. 23, 1982 [JP] Japan ................................ 57-128570

[51] Int. Cl.$^4$ .......................... G01D 15/16; H04N 1/23
[52] U.S. Cl. .................. 346/1.1; 346/140 R; 358/75; 358/298
[58] Field of Search ............... 346/1.1, 140, 75, 46; 358/75, 78

[56] References Cited

U.S. PATENT DOCUMENTS

| | | |
|---|---|---|
| Re. 27,555 | 1/1973 | Loughren . |
| 1,656,338 | 1/1928 | Ranger ............................ 358/283 X |
| 1,790,723 | 2/1931 | Ranger ............................ 358/283 X |
| 1,817,098 | 8/1931 | Ranger ............................ 358/75 |
| 3,197,558 | 7/1965 | Ernst . |
| 3,404,221 | 10/1968 | Loughren . |
| 3,681,650 | 8/1972 | Koll . |
| 3,683,212 | 8/1972 | Zoltan . |
| 3,739,084 | 6/1973 | Heinrich . |
| 3,747,120 | 7/1973 | Stemme . |
| 3,864,696 | 2/1975 | Fischbeck . |
| 3,961,306 | 6/1976 | Anstey . |
| 3,977,007 | 8/1976 | Berry et al. . |
| 4,050,077 | 9/1977 | Yamada . |
| 4,108,654 | 8/1978 | Goren . |
| 4,178,597 | 12/1979 | Isayama et al. . |
| 4,272,771 | 6/1981 | Furukawa . |
| 4,300,142 | 11/1981 | Kos . |
| 4,313,684 | 2/1982 | Tazaki et al. . |
| 4,314,274 | 2/1982 | Atoji et al. . |
| 4,339,774 | 7/1982 | Temple . |
| 4,342,051 | 7/1982 | Suzuki et al. . |
| 4,353,079 | 10/1982 | Kawanabe . |
| 4,365,275 | 12/1982 | Berman et al. . |
| 4,368,491 | 1/1983 | Saito . |
| 4,386,272 | 5/1983 | Check, Jr. et al. . |
| 4,389,712 | 6/1983 | Frattarola et al. . |
| 4,394,662 | 7/1983 | Yoshida et al. . |
| 4,394,693 | 7/1983 | Shirley . |
| 4,403,874 | 9/1983 | Payne ............................ 358/78 X |
| 4,412,225 | 10/1983 | Yoshida et al. . |
| 4,412,226 | 10/1983 | Yoshida . |
| 4,413,275 | 11/1983 | Horiuchi . |
| 4,414,635 | 11/1983 | Gast et al. . |
| 4,431,319 | 2/1984 | Karaki et al. . |
| 4,438,453 | 3/1984 | Alston . |
| 4,446,470 | 5/1984 | Sugiyama et al. . |

(List continued on next page.)

Primary Examiner—Joseph W. Hartary
Attorney, Agent, or Firm—Fitzpatrick, Cella, Harper & Scinto

[57] ABSTRACT

A method for forming images with a gradation characteristic based on the arrangement of image forming elements comprises modulating an arrangement pitch of the image forming elements in at least one arrangement direction without quantization in accordance with the gradation level.

10 Claims, 39 Drawing Figures

U.S. PATENT DOCUMENTS

| | | |
|---|---|---|
| 4,468,706 | 8/1984 | Cahill . |
| 4,488,245 | 12/1984 | Dalke et al. . |
| 4,492,965 | 1/1985 | Ohnishi et al. . |
| 4,494,128 | 1/1985 | Vaught . |
| 4,499,479 | 2/1985 | Chee-sh En Lee et al. . |
| 4,533,920 | 8/1985 | Suzuki . |
| 4,533,923 | 8/1985 | Suzuki ................................. 346/1.1 |
| 4,533,928 | 8/1985 | Sugiura et al. . |
| 4,547,812 | 10/1985 | Waller et al. . |
| 4,549,222 | 10/1985 | Fogaroli et al. . |
| 4,559,542 | 12/1985 | Mita . |
| 4,560,997 | 12/1985 | Sato et al. . |
| 4,580,150 | 4/1986 | Tazaki . |
| 4,595,948 | 6/1986 | Itoh et al. . |
| 4,604,654 | 8/1986 | Sakurada et al. . |
| 4,631,578 | 12/1986 | Sasaki et al. . |
| 4,635,078 | 1/1987 | Sakurada et al. . |

FOREIGN PATENT DOCUMENTS

| | | |
|---|---|---|
| 52-11712 | 1/1977 | Japan . |
| 53-102034 | 9/1978 | Japan . |
| 57-156264 | 9/1982 | Japan . |
| 58-60878 | 11/1983 | Japan . |
| 58-212970 | 12/1983 | Japan . |
| 59-52658 | 3/1984 | Japan . |
| 59-41969 | 3/1984 | Japan . |

OTHER PUBLICATIONS

IBM Technical Disclosure Bulletin, vol. 21, Oct. 1978, "Digital Color Printer", Skinner, et al.

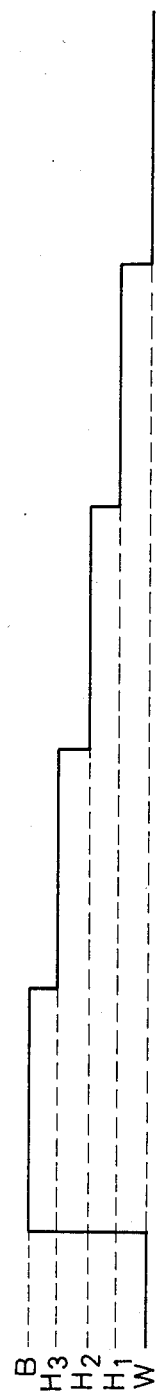
FIG. 1(a)
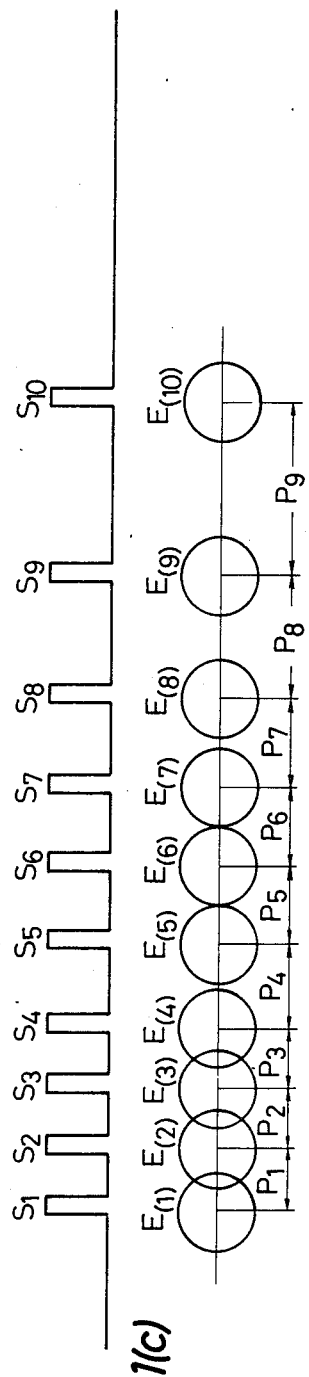
FIG. 1(b)
FIG. 1(c)

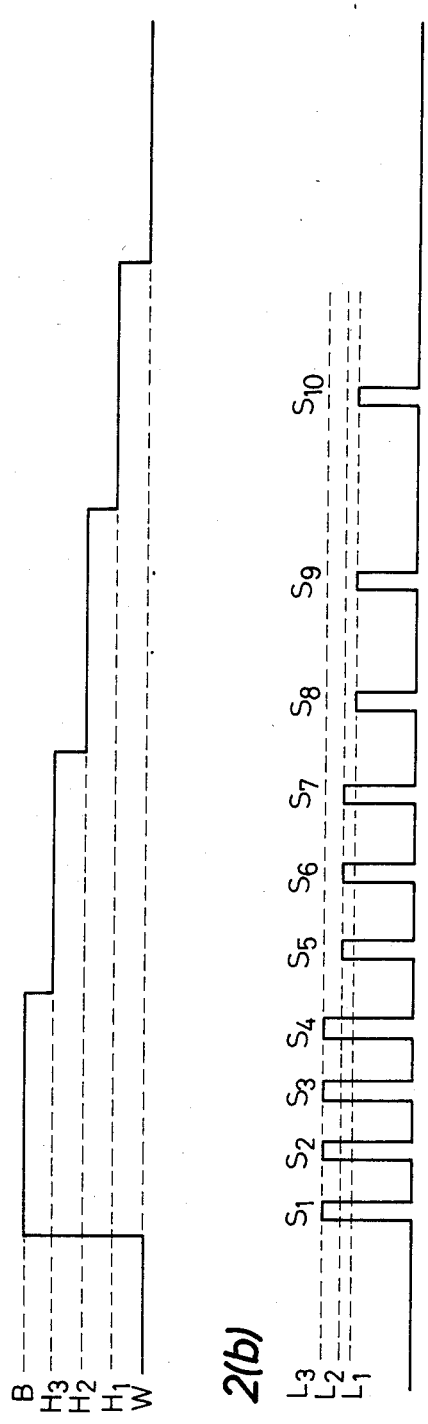
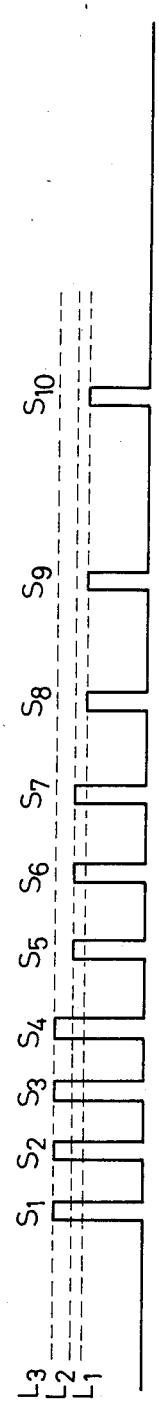
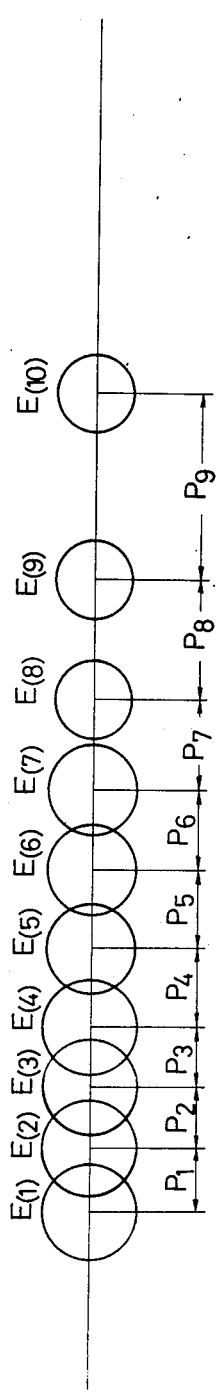
FIG. 2(a)
FIG. 2(b)
FIG. 2(c)

FIG. 4
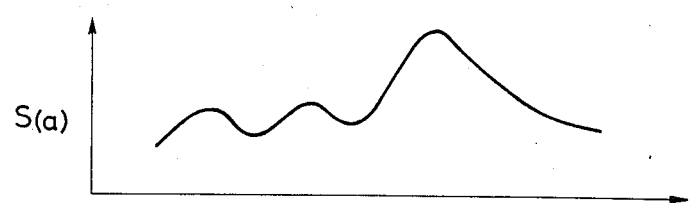
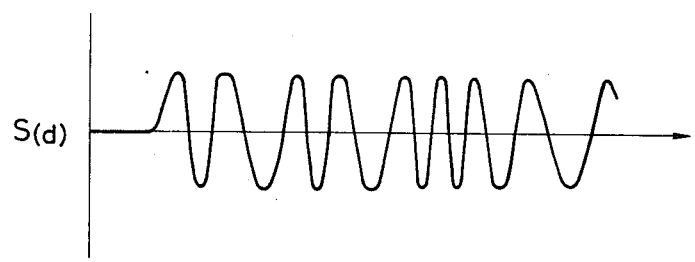
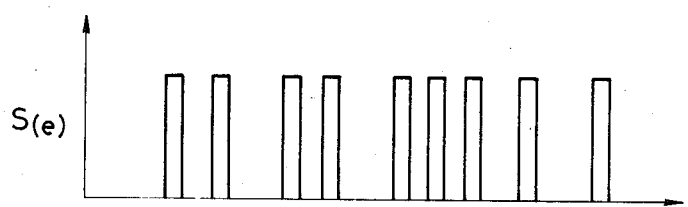
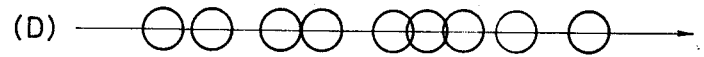

IMAGE FORMING METHOD USING IMAGE FORMING ELEMENTS HAVING DIFFERENT CONCENTRATIONS AND PITCHES

This application is a continuation of application Ser. No. 514,622 filed July 18, 1983 now abandoned.

BACKGROUND OF THE INVENTION

1. Field of the Invention

This invention relates to an image forming method which expresses so called image informations in two dimensions such as letters, figures, graphs, images, etc. in a visually sensible form, and particularly to an image forming method which expresses image informations having gradation characteristics.

2. Description of the Prior Art

As methods of expressing an image information having a gradation characteristic, namely an image information containing half-tone information in a visually sensible state, there may be mentioned as an example of the prior art a method in the field of, for example, image information recording, in which image information is expressed by controlling the number of image forming elements having a certain optical density and a certain area to be provided within a desired certain minute area such unit area hereinafter called a cell) constituting an image element and the state of arrangement of said image forming elements within said image element.

That is, according to said example of the prior art, for example, one image element may be sub-divided into a matrix of plural number of a cells which can be each occupied by only one image forming element (hereinafter called as cell matrix), and a desired level of gradation characteristic can be expressed depending on the number of cells occupied by the image forming elements and the arrangement of the image forming elements occupying the cells among the cells constituting said cell matrix. And, the image forming elements are arranged necessarily with arrangement pitches which are as large as the minimum arrangement pitch determined by the size of the cell (hereinafter called the standard arrangement pitch Ps) multiplied by a whole number (this is hereinafter expressed as the image forming elements being arranged under a quantized arrangement pitch).

According to this method, in order to enhance the gradation characteristic, the area of one image element per se (image delivery area) is required to be enlarged, or the area of the image forming element is required to be made as small as possible to increase the number of cells constituting one image element.

However, in the former case, it is an undeniable fact that sharpness or resolution is lowered to a greater extent as the area of the image element is increased, which makes the image coarse, and therefore this approach is not desirable from a practical point of view. Also, in the latter case, when the cell number constituting one image element is attempted to be increased while maintaining extent of sharpness or resolution, the extent of improvement is inherently limited due to the limitation with respect to reduction of the area of the image forming element.

Accordingly, when it is desired to express a gradation in a broad range from a gradation level of higher optical density to a gradation level of lower optical density, the gradation expression obtained lacks in fineness of texture due to a deficiency in gradation level numbers only giving images which provide a feeling of "graininess" or "roughness". On the other hand, when the gradation characteristic is attempted to be expressed with fine texture, either the highlighted portion or the dark portion cannot be expressed due to the breadth of the gradation expression which cannot be made so broad, whereby the resultant image is such that a feeling of "glittering" is imparted to the highlighted portion to give a stimulating image, when the gradation characteristic at the dark portion is intended to be expressed sufficiently well, while the image as a whole becomes lower in tone and lacking in sharpness, when the gradation characteristic at the highlighted portion is intended to be expressed sufficiently well. In short, in either case, no attempt to express the gradation characteristic with fine texture will be successful in well-balanced selection of the region to be expressed, thus giving only an unnatural image.

In particular, in case of photographic images, unnaturalness is marked in reproduction of the highlighted portion or the skin portion of a person, and it is difficult to express half-tones smoothly and continuously over a wide range.

On the other hand, for example, in an ink jet recording method wherein image recording is performed by forming flying ink droplets and permitting said ink droplets to be attached on a material to be recorded (e.g. sheet material such as of paper, plastics, ceramics, etc.), thereby forming ink dots (one of the image forming elements), it has already been proposed to use liquid or solid inks with different color densities (for each color in case of color recording) which are to be employed in different manners to carry out recording.

And, when image portions with equal optical reflective densities at a certain area (hereinafter written as "average reflective density") are to be expressed, two expressions may be possible, one being the expression by forming dots with small area with a high density (high color density) ink under a desired dot pitch (arrangement pitch of dots), and the other being the expression by forming dots with large area with a low density (low color density) ink (of course, use of inks with different densities is not limited to the two kinds, but two or more kinds of inks, and two or more kinds of colors may also similarly be referred to, although this explanation is only of the case in which two kinds of inks of high density and low density are employed). However, even if the average reflective densities of the two images expressed may be approximately equal to each other, viewing of the finished image will give an impression to the human eyes as if there were a great difference in the quality of the image. Of course, such a feeling will vary depending on the color density and the dot pitch, but, generally speaking, a "grainy" feeling is strengthened in an image expressed with formation of small area dots by use of a high density ink, which has been frequently a great cause of a loss naturalness of the image in general image expressions.

On the other hand, when the expression of the minimum optical density (the lowest gradation level) in the image expression is intended to be expressed without formation of dots, there is formed a white drop-out portion on the image, which white drop-out portion is clearly changed in tone from the image portions in which other dots have been formed, thus being a factor in lowering image quality.

SUMMARY OF THE INVENTION

The present invention has been accomplished in view of the various points as described above, and it is a primary object of the present invention to propose an image forming method capable of expressing a gradation characteristic with fine texture in a broad gradation expressing region from a gradation level of higher optical density to a gradation level of lower optical density.

Another object of the present invention is to propose an image forming method capable of providing images excellent in sharpness and resolution.

Still another object of the present invention is to propose an image forming method capable of expressing images of high image quality, especially enriched in naturalness with repose, giving no feeling of graininess or "roughness".

Still another object of the present invention is to propose an image forming method, which comprises forming images according to the arrangement of image forming elements, wherein the arrangement pitch in at least one of the arrangement directions for the image forming elements is modulated under nonquantization depending on the level of gradation thereby to form images with a gradation characteristic.

Still another object of the present invention is to provide an image forming method, which comprises forming images according to the arrangement of image forming elements, wherein the expression region is constituted to have a gradation characteristic which can be expressed by an expression region with a gradation characteristic modulated under nonquantization of the arrangement pitch in at least one arrangement direction of the image forming elements and an expression region with a gradation characteristic modulated by the area of said image forming elements.

Still another object of the present invention is to propose an image forming method capable of forming images with a gradation characteristic, which comprises forming images according to the arrangement of plural image forming elements with different optical densities, wherein the arrangement pitch of the image forming elements in at least one arrangement direction of at least one image forming element is modulated under non-quantization depending on the levels of the gradation characteristic.

Still another object of the present invention is to propose an image forming method capable of forming images with a gradation characteristic, which comprises forming images according to the arrangement of plural image forming elements with different optical densities, wherein the expression region is constituted with a gradation which can be expressed by all of the image forming elements, of which either one of the arrangement pitch or area is modulated by an expression region with a gradation characteristic by modulation under non-quantization of the arrangement pitch in at least one arrangement direction of at least either one of the image forming elements and an expression region with a gradation characteristic by modulation of the area of at least one image forming element of said plural image forming elements.

The "image forming element" to be used in the present specification corresponds to the recording dot on a material to be recorded by so called dot recording, in which recording is effected by dot formation, as in ink jet recording, heat-sensitive recording, heat-sensitive transfer recording, wire dot recording, electrostatic recording, etc. The "optical reflective density" and the "density (color density)" of the ink frequently used in the following description refer to the optical reflective density and the optical transmissive density, respectively, measured by a commercially available densitometer, and, in measurement of the reflective density, there was employed the standard value which was the value when using a standard white paper widely employed.

BRIEF DESCRIPTION OF THE DRAWINGS

FIGS. 1a–c and FIGS. 2a–c are schematic illustrations for explanation of the basic concept of the present invention, respectively;

DESCRIPTION OF THE PREFERRED EMBODIMENTS

Figure 3:
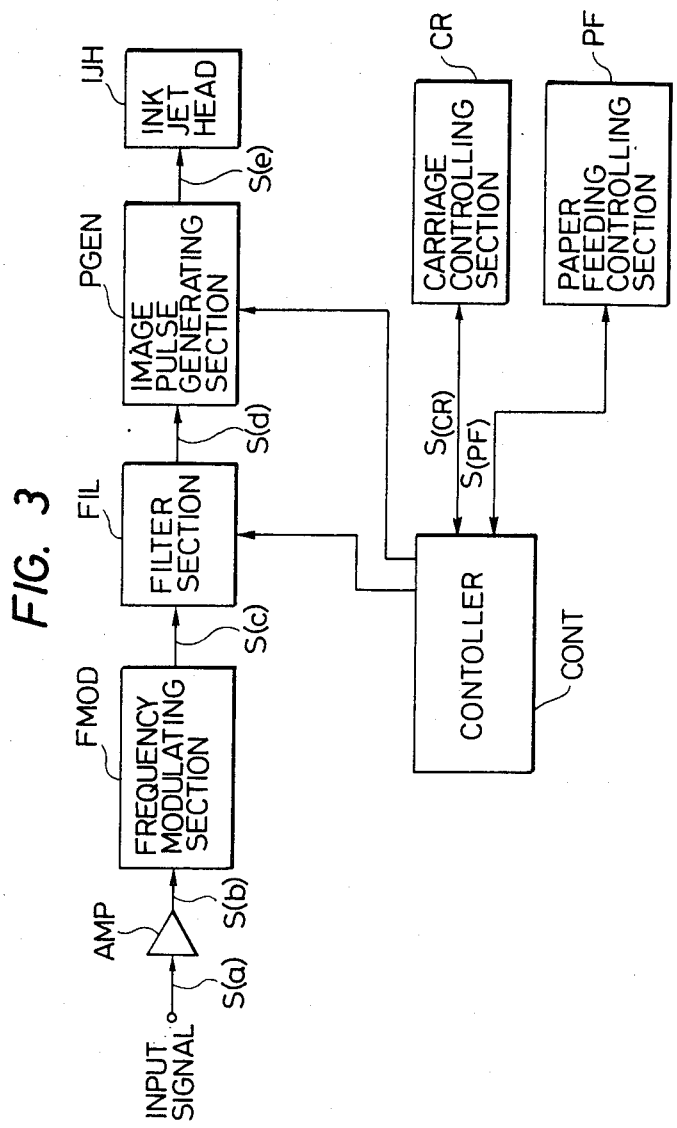
FIG. 3, FIGS. 5 through 10, FIGS. 12 through 16, FIG. 23, FIGS. 25 through FIG. 30, FIGS. 32 through 36 are each a block diagram of a device embodying the present invention, and, FIG. 4, FIG. 11, FIG. 24 and FIG. 31 are each illustration for explanation of the timing of signal and the state of dot arrangement, FIG. 3 and FIG. 4 showing a first embodiment, FIG. 5 a second embodiment, FIG. 6 a third embodiment, FIG. 7 a fourth embodiment, FIG. 8 a fifth embodiment, FIG. 9 a sixth embodiment, FIG. 10 and FIG. 11 a seventh embodiment, FIG. 12 a eighth embodiment, FIG. 13 a ninth embodiment, FIG. 14 a tenth embodiment, FIG. 15 an eleventh embodiment, FIG. 16 a twelfth embodiment, FIG. 23 and FIG. 24 a thirteenth embodiment, FIG. 25 a fourteenth embodiment, FIG. 26 a fifteenth embodiment, FIG. 27 a sixteenth embodiment, FIG. 28 a seventeenth embodiment, FIG. 29 a eighteenth embodiment, FIG. 30 and FIG. 31 a nineteenth embodiment, FIG. 32 a twentieth embodiment, FIG. 33 a twenty-first embodiment, FIG. 34 a twenty-second embodiment, FIG. 35 a twenty-third embodiment, FIG. 36 a twenty-fourth embodiment, respectively.

Referring now the drawings, the present invention is to be described in detail.

FIG. 1 is an illustration for explanation of one of the basic concepts of the present invention.

Now, the change in optical reflective density in one scanning line of an image to be expressed (of course, it may be expressed as the optical transmissive density) is assumed to be shown by the density signal series (a) as shown in FIG. 1.

W shows the lowest level of gradation, namely the lowest level in optical reflective density, for example, white level, while B shows the highest level of gradation, namely the highest level in optical reflective density, for example, black level, $H_1$, $H_2$ $H_3$ showing optical reflective densities at intermediate levels therebetween, respectively.

The (b) shown in FIG. 1 is an expression signal series for expression and arrangement of the image forming elements (in the Figure, as the shape of the image forming element, is shown the circular form generally employed) to be formed according to the density signal series (a), and in the Figure are shown the pulse signals $S_1$–$S_{10}$ with the same widths and levels in a time series under non-quantized arrangement pitches. The image forming elements E for image formation are arranged on a material to be recorded such as paper under non-quantized arrangement pitches, and under the arrangement state of said image forming elements E, the gradation characteristic having the density changes exhibited by the density signal series (a) is exhibited.

That is, in FIG. 1, the arrangement pitches between respective image forming elements $E_1$-$E_{10}$ to be arranged each in correspondence to each of the pulse signals $S_1$-$S_{10}$, have the relationship of $P_1=P_2=P_3<P_5=P_6<P_4<P_7<P_8<P_9$, which are not multiples by a whole number of the minimum arrangement pitch $P_1$. In short, the respective arrangement pitches are not quantized by the arrangement pitch $P_1$.

In the present invention, an image having a desired gradation characteristic is expressed without lacking naturalness by modulating continuously the arrangement pitches P of the image forming elements E in this manner in correspondence to the gradation levels to be expressed.

In the present invention, the arrangement pitches P may be modulated continuously from 0 (the state under which the two image forming elements are completely overlapped with each other: in case of the circular shape of image forming elements E as shown in FIG. 1, the state where the central points of the circles coincide with each other) to a value to be determined as desired depending on the desired image quality of an image to be formed. The upper limit of the modulation region for the arrangement pitches is determined by the value of duty ratio $D=(\overline{S_1}+\overline{S_2})/(\overline{\pi \cdot P})$, wherein $S_1$ and $S_2$ are areas of the two image forming elements sequentially arranged and P is the arrangement pitch. That is, as the duty ratio D is made smaller, naturalness of the image is gradually lost until naturalness is abruptly lost at a certain value or lower.

This tendency is more marked as the optical reflective density of an image forming element is higher.

In the present invention, when the image forming elements E have high optical reflective densities, the arrangement pitches should desirably be modulated under the conditions of the duty ratio D of 0.5 or higher for accomplishing more effectively the objects of the invention.

In the present invention, the image forming elements E can be arranged with continuity to an arrangement state from the completely overlapped state to the completely separated state by modulating continuously the arrangement pitches P of the image forming elements E from 0 to a value suitably determined as desired under non-quantization.

That is, to describe with reference to FIG. 1, at the density level B, the image forming elements E(1), E(2), E(3) and E(4) are arranged at the same arrangement pitch ($P_1=P_2=P_3$) so that overlapping regions may be partially formed in the occupied region. At the density level $H_3$, the image forming elements E(5), E(6), and E(7) are arranged at the arrangement pitch ($P_5=P_6$) so that they are circumscribed with adjacent image forming elements, respectively. Between the density level B and the density level $H_3$, an intervening arrangement pitch $P_4$ is given to change the arrangement pitch. At the density level $H_2$, the image forming elements are arranged at desired intervals from each other under an arrangement pitch of $P_8$, and the density level D is expressed by one image forming element E(10). And, between the density level B and the density level C, and between the density level C and the density level D, there are given arrangement pitches $P_7$ and $P_9$, respectively, to change the arrangement pitches.

FIG. 2 is an illustration for explanation of another basic concept of the present invention. Now, the changes in optical reflective densities (of course, optical transmissive densities may be employed for expression) on one scanning line of an image to be expressed are assumed to be expressed by, for example, the density signal series (a) in FIG. 2.

W shows the lowest level of gradation, namely the lowest level in optical reflective density, for example, white level, while B shows the highest level of gradation, namely the highest level in optical reflective density, for example, black level, $H_1$, $H_2$ and $H_3$ ($H_1<H_2<H_3$) showing optical reflective densities at intermediate levels therebetween, respectively.

The (b) shown in FIG. 2 is an expression signal series for expression and arrangement of the image forming elements (in the Figure, as the shape of the image forming element, is shown the circular form generally employed) to be formed according to the density signal series (a), and in the Figure are shown the pulse signals $S_1$-$S_{10}$ with the same widths but with varying levels of $L_1$, $L_2$ and $L_3$ in a time series under non-quantized arrangement pitches. The image forming elements E for image formation are arranged on a material to be recorded such as paper under non-quantized arrangement pitches, and under the arrangement state of said image forming elements E, the gradation characteristic having the density changes exhibited by the density signal series (a) is exhibited.

That is, in FIG. 2, the arrangement pitches between respective image forming elements $E_1$-$E_{10}$ to be arranged each in correspondence to each of the pulse signals $S_1$-$S_{10}$, have the relationship of $P_1=P_2=P_3<P_5=P_6<P_4<P_7<P_8<P_9$, which are not multiples by a whole number of the minimum arrangement pitch $P_1$. In short, the respective arrangement pitches are not quantized by the arrangement pitch $P_1$. And, the areas of the image forming elements E are also modulated according to the levels of the pulse signal (b), respectively, such as $E(1)=E(2)=E(3)>E(5)=E(6)=E(7)>E(8)=E(9)=E(10)$.

In the image forming method as described with reference to FIG. 2, an image having a desired gradation characteristic is expressed without lacking naturalness by modulating continuously the arrangement pitches P of the image forming elements E in this manner in correspondence to the gradation levels to be expressed.

Also as similarly described in FIG. 1, in case of the image forming method as described with reference to FIG. 2, the arrangement pitches P may be modulated continuously from 0 (the state under which the two image forming elements are completely overlapped with each other: in case of the circular shape of image forming elements E as shown in FIG. 2, the state where the central points of the circles coincide with each other) to a value to be determined as desired depending on the desired image quality of an image to be formed. The upper limit and the lower limit of the modulating region for the arrangement pitches may also be determined similarly as described in FIG. 1.

In the image forming method of the present invention as described with reference to FIG. 2, the image forming elements E can be arranged with continuity to an arrangement state from the completely overlapped state to the completely separated state by modulating continuously the arrangement pitches P of the image forming elements E from 0 to a value suitably determined as desired under non-quantization. Also, the areas of the image forming elements E can be modulated continuously from the minimum area value to the maximum area value.

That is, to describe with reference to FIG. 2, at the density level B, the image forming elements E(1), E(2), E(3) and E(4) are arranged at the same arrangement pitch (P1=P2=P3) so that overlapping regions may be partially formed in the occupied region. At the density level $H_3$, the image forming elements E(5), E(6) and E(7) are arranged at the arrangement pitch (P5=P6) so that they are circumscribed with adjacent image forming elements, respectively. Between the density level B and the density level $H_3$, an intervening arrangement pitch $P_4$ is given to change the arrangement pitch. At the density level $H_2$, the image forming elements E(8), E(9) with smaller areas than the image forming element E(5) are arranged at desired intervals from each other under an arrangement pitch of $P_8$, and the density level $H_1$ is expressed by one image forming element E(10).

And, between the density level $H_3$ and the density level $H_2$, and between the density level $H_2$ and the density level $H_1$, there are given arrangement pitches $P_7$ and $P_9$, respectively, to change the arrangement pitches.

Thus, in the image forming method according to the present invention, gradation expression can be made smoothly over a wide expression width according to the analog-type modulation of the two factors of the arrangement pitch and the area of the image forming elements E.

FIG. 3 shows a block diagram in which the image forming method with the basic concept as described in FIG. 1 is applied for a monochromatic printer of an on-demand ink jet system. The input signal S(a) having a gradation such as of a video signal is amplified by an amplifier AMP and inputted into the frequency modulating section FMOD. The gradation signal S(b) amplified is modulated in frequency by the frequency modulating section FMOD according to the gradation characteristic and inputted as the signal S(c) to the filter section FIL. The gradation signal S(c) modulated in frequency, after the frequency modulated signal exceeding the maximum response frequency of the ink jet head IJH is cut by controlling of the controller CONT at the filter section FIL, is inputted as the signal S(d) into the image pulse generating section PGEN. The signal S(d) inputted into the image pulse generating section PGEN generates the driving signal S(e) for the ink jet head IJH with the threshold value given by the controller CONT as the standard. By the driving signal S(e), the ink jet head IJH repeats on-off actuations, whereby ink liquids are discharged from the discharging orifices provided on the ink jet head IJH per said repeated actuations to form flying ink droplets. Synchronized with discharging of ink liquids, the controller CONT supplies controlling signals S(CR), S(PF) to the carriage controlling section CR and to the paper feeding controlling section PF, respectively, according to which signals the ink jet head IJH is scanned on a recording paper, thereby forming an image with a gradation characteristic on the recording paper.

FIG. 4 shows an example of signals at respective sections in the embodiment shown in FIG. 3 exhibited in time series and the dot arrangement state on a recording paper.

In FIG. 4, D shows an example of the arrangement state of dots, in which the pitches between dots are varied corresponding to the gradation levels, and the optical densities are enhanced also by overlapping of the dots at a high optical density input region.

Figure 5:
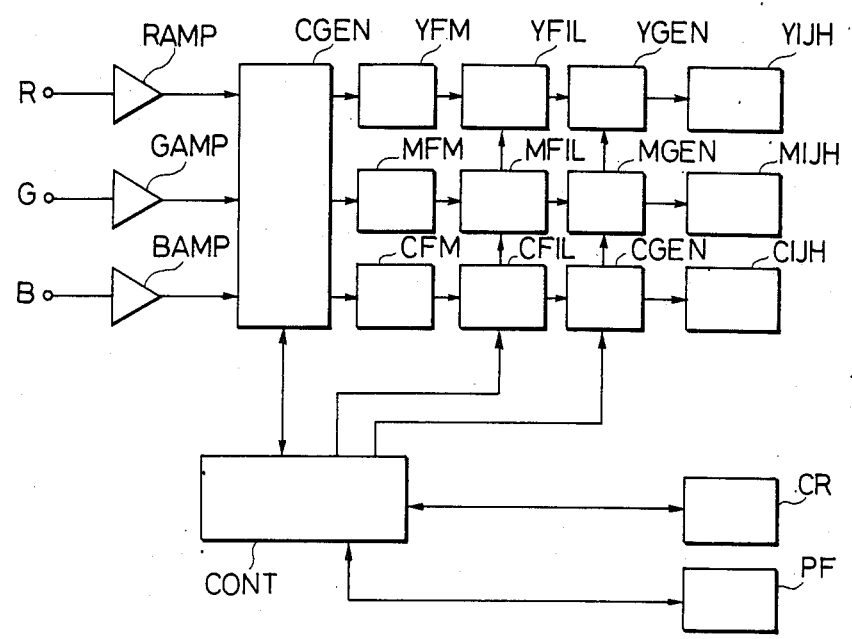

FIG. 5 is a block diagram of a second embodiment of the present invention, in the case when applied for a color printer for printing images with the user of inks of the three colors of yellow, magenta and cyan according to the on-demand ink jet system.

First, the respective color input signals of red (R), green (G) and blue (B) are amplified by the amplifiers RAMP, GAMP and BAMP, respectively, and inputted into the color signal generating section CGEN. The amplified respective color signals, after the signal treatments according to the controlling signals generated from the controller CONT, are inputted into the frequency modulating sections YFM, MFM and CFM, respectively. The respective color signals modulated by YFM, MFM and CMF are inputted into the filter sections YFIL, MFIL and CFIL, respectively. The modulated respective color signals are subjected to cutting of the signals in the frequency region exceeding the maximum response of the respective ink jet heads based on the controlling signals outputted from the controller CONT in YFIL, MFIL and CFIL and then inputted to the image forming pulse generating sections YGEN, MGEN and CGEN, respectively. The signals inputted into the respective pulse generating sections YGEN, MGEN and CGEN form driving signals for the ink jet heads YIJH, MIJH and CIJH with the threshold values given by the controller CONT as the standards, respectively. By the driving signals, the respective ink jet heads YIJH, MIJH and CIJH repeat on-off actuations thereby to form flying ink droplets. Synchronized with discharging of the ink liquid, the controller CONT outputs controlling signals to the carriage controlling section CR and the paper feeding controlling section PF, whereby the respective ink jet heads YIJH, MIJH and CIJH scan over the recording paper.

Figure 6:
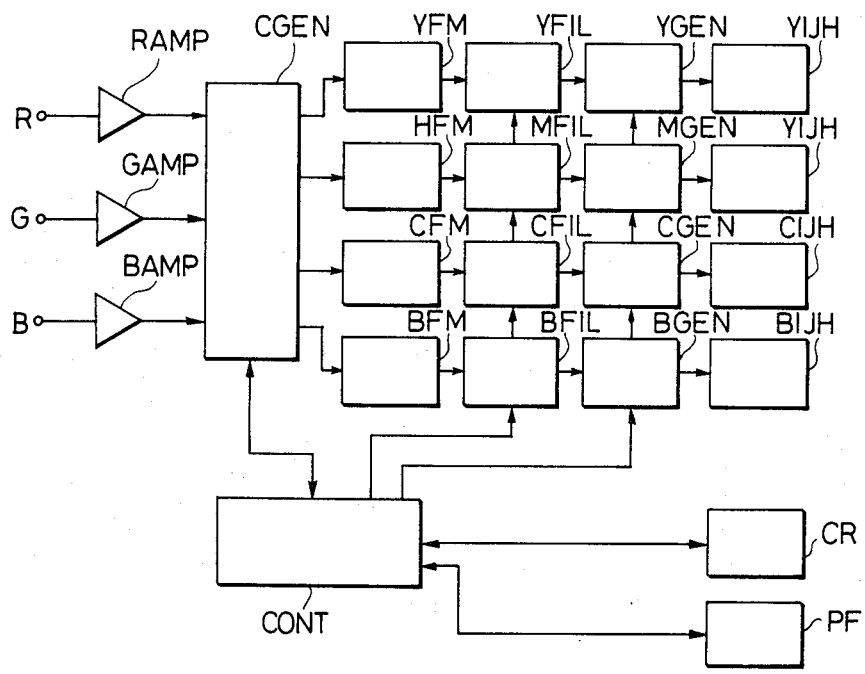

FIG. 6 is a block diagram of a third embodiment of the present invention, in the case when applied for a color printer for printing images with the use of the four colors of yellow, magenta, cyan and black according to the on-demand ink jet system. In case of said embodiment, the content of basic signal treatment is the same as in the tri-color printer shown in FIG. 5, except for addition after the color signal generating section et seq of a black signal frequency modulating section BFM, a filter section for black signal BFIL, a pulse generating section for black signal BGEN and an ink jet head for black signal BIJH.

Figure 7:
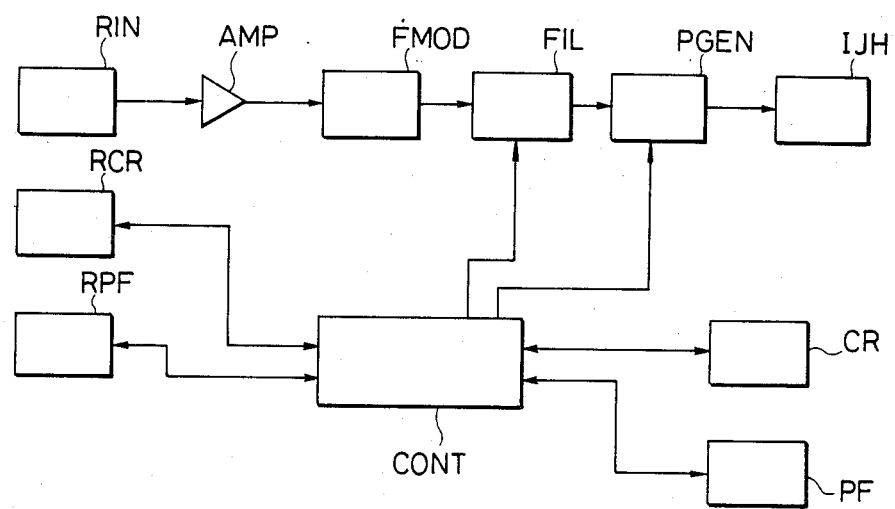

FIG. 7 is a fourth embodiment of the present invention, when applied for a monochromatic ink jet printing device of the on-demand ink jet system provided with a reading section for reading original images. The controlling signal from the controller CONT is inputted respectively into the main reading scanning controlling section RCR and the subsidiary reading scanning controlling section RPF, whereby the reading portion RIN scans over the original images to obtain the gradation signals to be inputted into the amplifier AMP. The treatments of the gradation signal inputted in the amplifier AMP et seq are the same as in the embodiment shown in FIG. 3, and the same symbols shown in this Figure correspond to those in FIG. 3.

Figure 8:
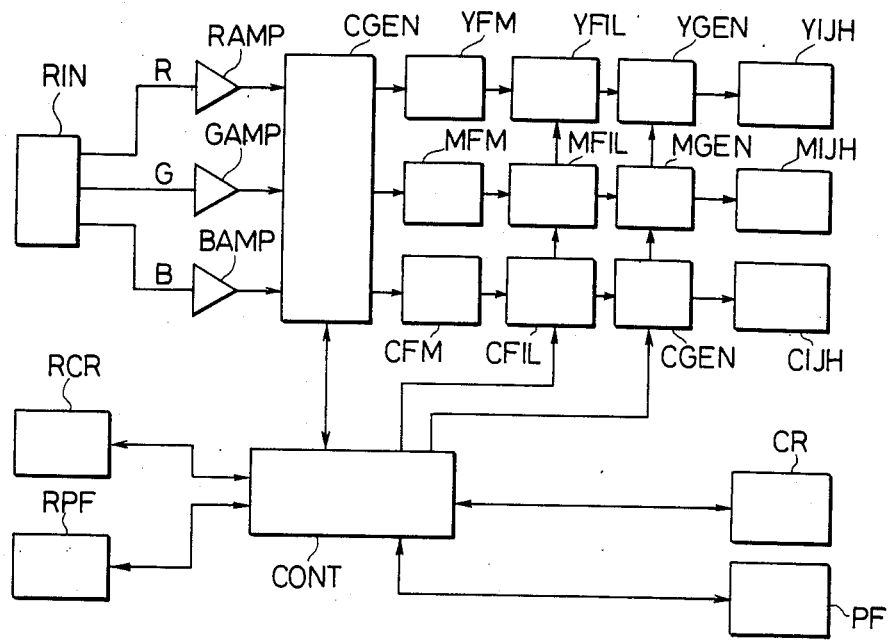

FIG. 8 in a fifth embodiment of the present invention, when applied for a color printing device for color printing with the use of the three colors of yellow, magenta and cyan according to the on-demand ink jet system provided with a reading section for reading original images. The controlling signal from the controller CONT is inputted respectively into the main reading scanning controlling section RCR and the subsidiary reading scanning controlling section RPF, whereby the reading portion RIN scans the original images to give the gradation signals of the three colors (R, G, B), respectively. The treatments of the gradation signals at the respective amplifiers (RAMP, GAMP, MAMP) et seq are the same as in the embodiment shown in FIG. 5. The same symbols also correspond to those shown in FIG. 5.

Figure 9:
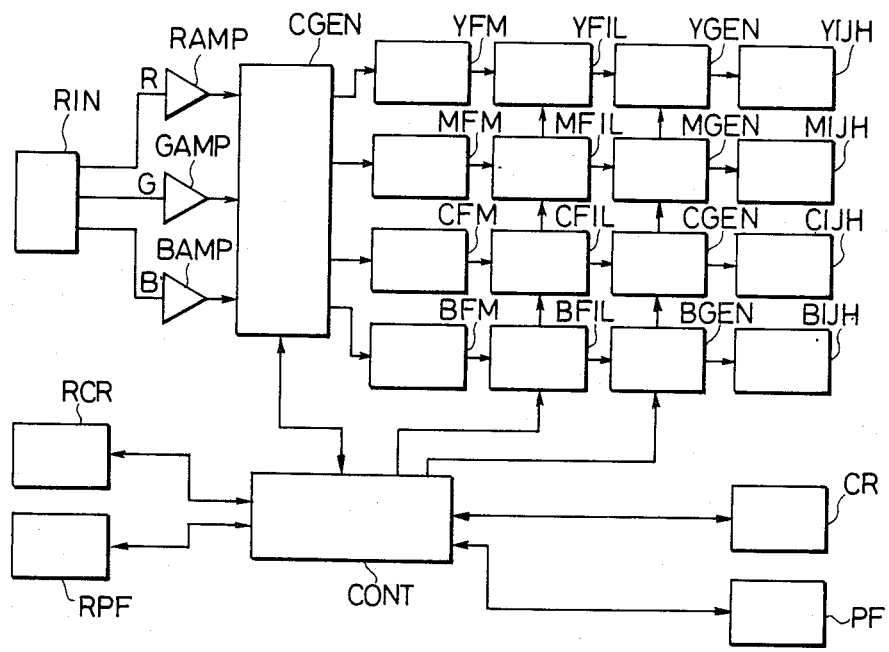

FIG. 9 is a sixth embodiment of the present invention, when applied for a color printing device for color printing with the use of the four colors of yellow, magenta, cyan and black according to the on-demand ink jet system provided with a reading section RIN for reading original images. The controlling signal from the controller CONT is inputted respectively into the main reading scanning controlling section RCR and the subsidiary reading scanning controlling section RPF, whereby the reading portion RIN scans over the original images to give the gradation signals of the three colors (R, G, B), respectively. The treatments of the gradation signals at the respective amplifiers (RAMP, GAMP, BAMP) et seq are the same as in the embodiment shown in FIG. 6. The same symbols also correspond to those shown in FIG. 6.

Figure 10:
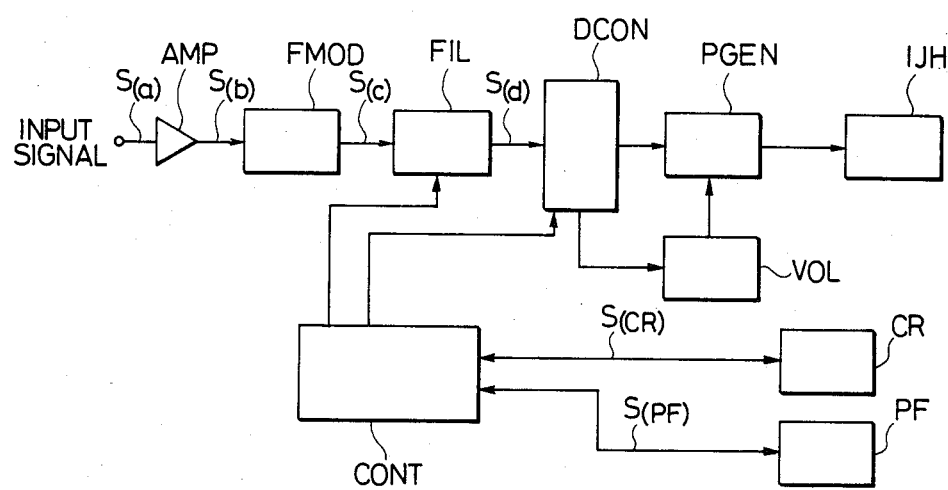

FIG. 10 shows a block diagram of the image forming method described in FIG. 2, when applied for a monochromatic printer of the on-demand ink jet system.

The input signal S(a) having a gradation such as of video signal is amplified by the amplifier AMP and inputted into the frequency modulating section FMOD. The amplified gradation signal S(b) is modulated in frequency by the frequency modulating section FMOD according to the gradation characteristic and inputted as the signal S(c) into the filter section FIL. The frequency modulated gradation signal S(c), after cutting of the frequency modulated signal exceeding the maximum response frequency of the ink jet head IJH by controlling of the controller CONT in the filter section FIL, is then inputted into the dot pitch/diameter controlling section DCON.

By the controlling signal outputted from the controller CONT corresponding to the signal S(d) inputted into the section for controlling dot pitch and diameter DCON, a voltage is obtained according to the gradation characteristic and at the same time dot pitches are given with the density threshold value given by the controller CONT as the standard. The voltage signal to be applied on ink jet head IJH outputted from the dot pitch/diameter controlling section DCON is inputted into the head driving voltage controlling section VOL to set the head driving voltage, which is then supplied to the image forming pulse generating section PGEN. At the image forming pulse generating section PGEN, the signal from the head driving voltage controlling section VOL is subjected to switching by the pulse signal from the controller DCON, thereby forming the driving signal for driving the ink jet head IJH. By this driving signal, the ink jet head IJH repeates on-off actuations, whereby ink liquids are discharged from the discharging orifices provided on the ink jet head IJH per said repeated actuations to form flying ink droplets. Synchronized with discharging of ink liquids, the controller CONT supplies controlling signals S(CR), S(PF) to the carriage controlling section CR and to the paper feeding controlling section PF, respectively, according to which signals the ink jet head IJH is scanned on a recording paper, thereby forming an image with a gradation characteristic on the recording paper.

Figure 11:
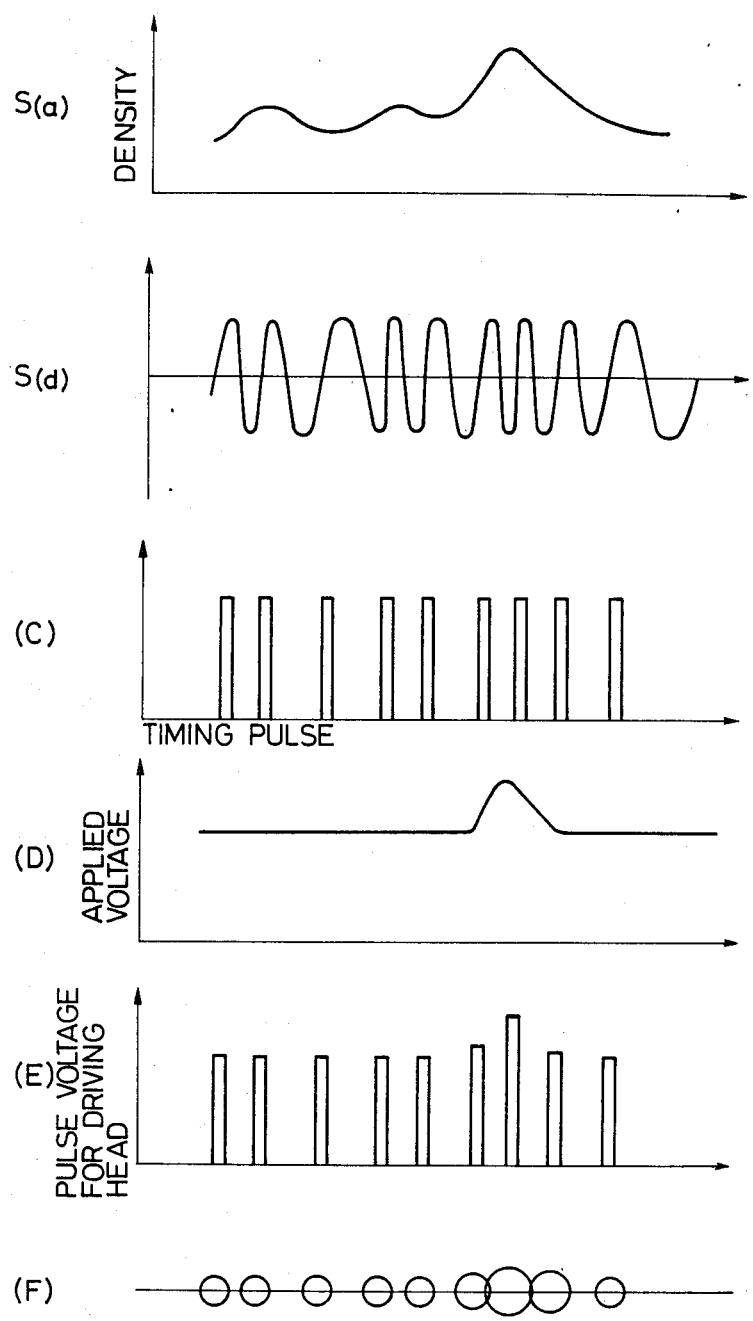

FIG. 11 shows an example of signals at respective sections in the embodiment shown in FIG. 10 exhibited in time series and the dot arrangement state on a recording paper.

In FIG. 11, (C) is the timing pulse for forming the driving signal for the ink jet head IJH and the applied head voltage is given by (D). By the above timing pulse (C) and the applied head voltage (D), there is formed the ink jet head driving signal (E), through which driving signal (E) is actuated on-off driving of the ink jet head IJH repeatedly to arrange the dots (image forming elements E) as shown by (F). The pitches between the dots (arrangement pitches) and the dot diameters are varied as shown in (F) corresponding to the gradation levels, and the width of gradation expression is broadened at a high optical density portion through overlapping of the dots.

In the embodiment shown in FIG. 11, pitch modulation is effected over the entire expressing region, while the modulation region of the dot diameter (dot area) is limited to the high optical density region. But, it is also possible in the present invention to effect pitch modulation and the dot area modulation at the same time.

That is, according to the present invention, the gradation expressing region according to the dot arrangement pitch modulation and the gradation expressing region according to dot area modulation are only required to be continuous to each other. For example, if the whole expressing region is supposed to be divided into the four sections of A B C D, a large number of gradation expressions may be possible according to combinations of pitch modulation and area modulation, as exemplified by (1) pitch modulation for the gradation expressing region AB, and area modulation for the gradation expression regions CD, (2) area modulation for the gradation expressing region A, simultaneous pitch and area modulation for the gradation expressing region BE, and area modulation for the gradation expressing region D, (3) pitch modulation for gradation expressing regions A and C, area modulation for gradation expressing regions B and D, (4) the cases where in the above examples, the modulation factors for the gradation expressing regions are exchanged, etc.

Figure 12:
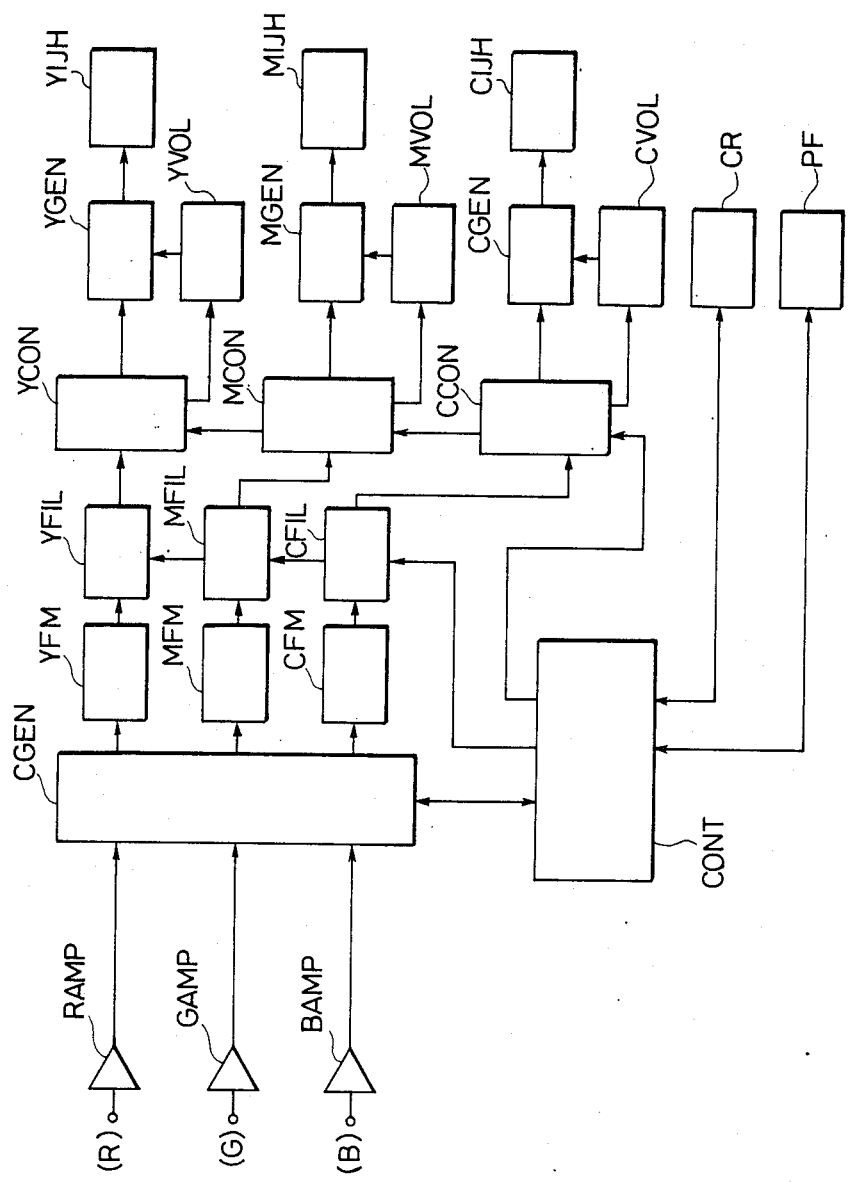

FIG. 12 is a block diagram of an eighth embodiment of the present invention, when applied for a color printer for printing images with the use of inks of the three colors of yellow, magenta and cyan according to the on-demand ink jet system.

First, a color video signal or color signals of red (R), green (G) and blue (B) are amplified by the amplifiers RAMP, GAMP and BAMP, respectively, and inputted into the color signal generating section CGEN. On the inputted signals, the controller CONT applies image treatments to output the output signals corresponding to the respective input signals. The output signals are inputted into the frequency modulating sections YFM, MFM and CFM, respectively. In the frequency modulating sections YFM, MFM and CFM, the input signals of the respective corresponding colors are modulated in frequency, and their output signals are inputted into the filters YFIL, MFIL and CFIL, respectively. The signals of the respective colors modulated in frequency in filters YFIL, MFIL and CFIL are subjected to cutting of the frequency modulated components exceeding the maximum response of the respective ink jet heads based on the controlling signals outputted from the controller CONT and then inputted to the dot pitch/diameter controlling sections YCON, MCON and CCON, respectively. From the signals inputted into the dot pitch/diameter controlling sections YCON, MCON and CCON, are obtained the dot timing signals and the head application voltage signals corresponding to the gradation changes. The respective dot timing signals outputted from the dot pitch/diameter controlling sections YCON, MCON and CCON are inputted into the image forming pulse generating sections YGEN, MGEN and CGEN, respectively. On the other hand, the respective head driving voltage signals outputted from the dot pitch/diameter controlling sections YCON, MCON and CCON are inputted into the head driving voltage controlling sections YVOL, MVOL and CVOL, respectively, to set the voltage values of the driving signals to be applied on corresponding heads.

At the image forming pulse generating sections or YGEN, MGEN and CGEN, switching of the signal currents from the head voltage controlling sections YVOL, MVOL and CVOL is effected by the input signals from the dot pitch/diameter controlling sections YCON, MCON and CCON, thereby forming the driving pulses for the ink jet heads IJY, IJM and IJC. By the driving signals, the respective ink jet heads YIJH, MIJH and CIJH repeat on-off actuations thereby to form flying ink droplets on said driving faces. Synchronized with discharging of the ink liquid, the controller CONT outputs controlling signals to the carriage controlling section CR and the paper feeding controlling section PF, whereby the respective ink jet heads scan over the recording paper.

Figure 13:
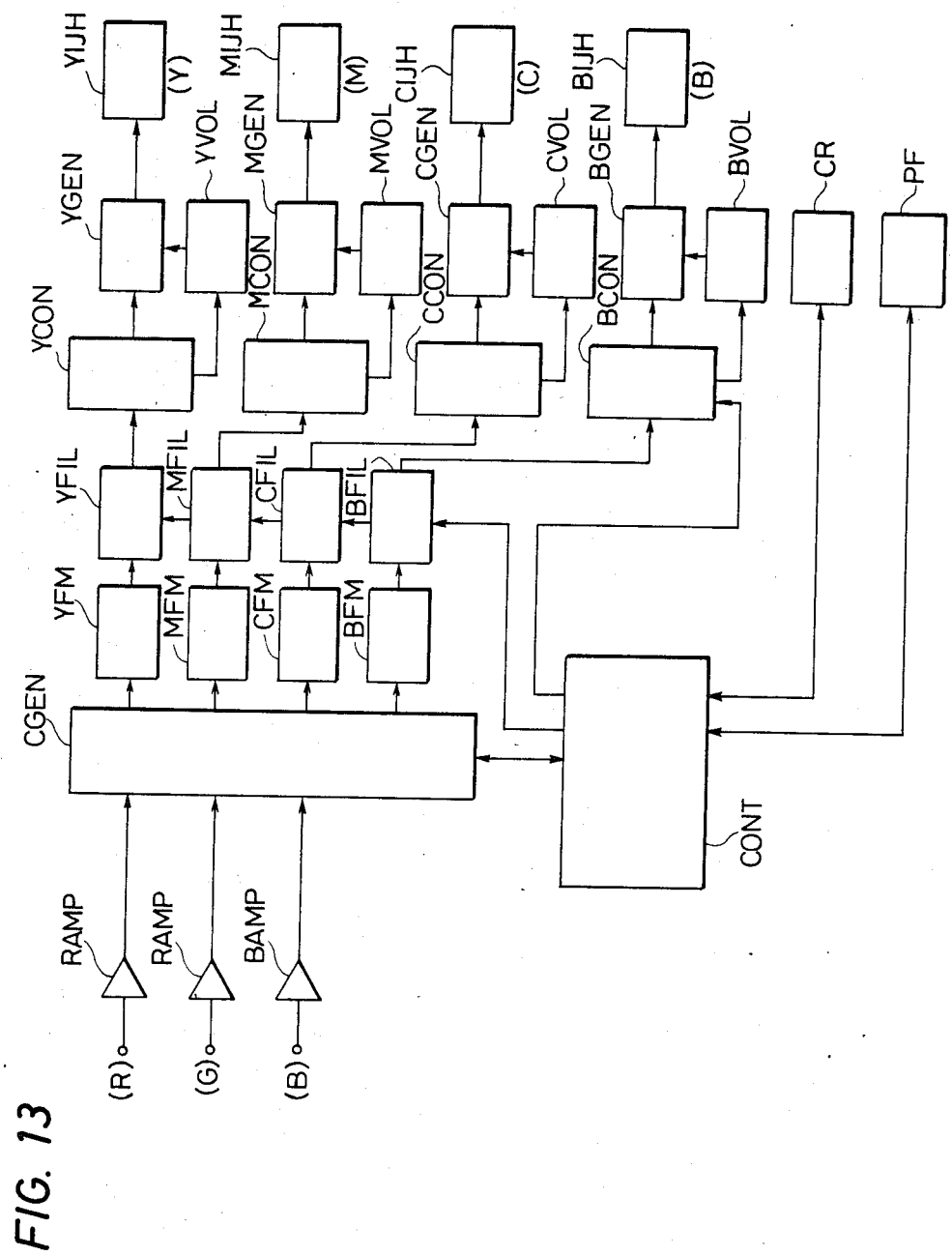

FIG. 13 is a block diagram of a ninth embodiment of the present invention, when applied for a color printer for printing images with the use of the four colors of yellow, magenta, cyan and black according to the on-demand ink jet system. The circuit block shown in FIG. 13 is the same as the color printer shown in FIG. 12, except for addition of the circuit portions for treating black signals, namely a frequency modulating section BFM, a filter section BFIL, a dot pitch/diameter controlling section BCON, a head voltage controlling section BVOL, an image forming pulse generating section BGEN and an ink jet head BIJH.

Figure 14:
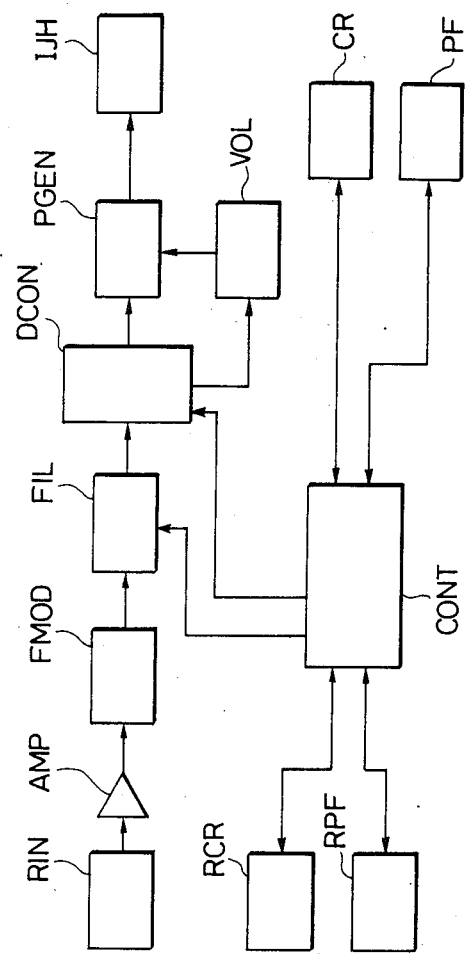

FIG. 14 is a block diagram of a tenth embodiment of the present invention, when applied for a monochromatic ink jet printing device of the on-demand ink jet system provided with a reading section for reading original images.

By the controlling signal from the controller CONT, the main reading scanning controlling section RCR and the subsidiary reading scanning controlling section RPF are controlled, whereby the reading portion RIN scans over the original images to obtain the gradation signals. Subsequent treatments of the gradation signals are the same as in the embodiment shown in FIG. 10, and the same symbols shown in this Figure correspond to those in FIG. 10.

Figure 15:
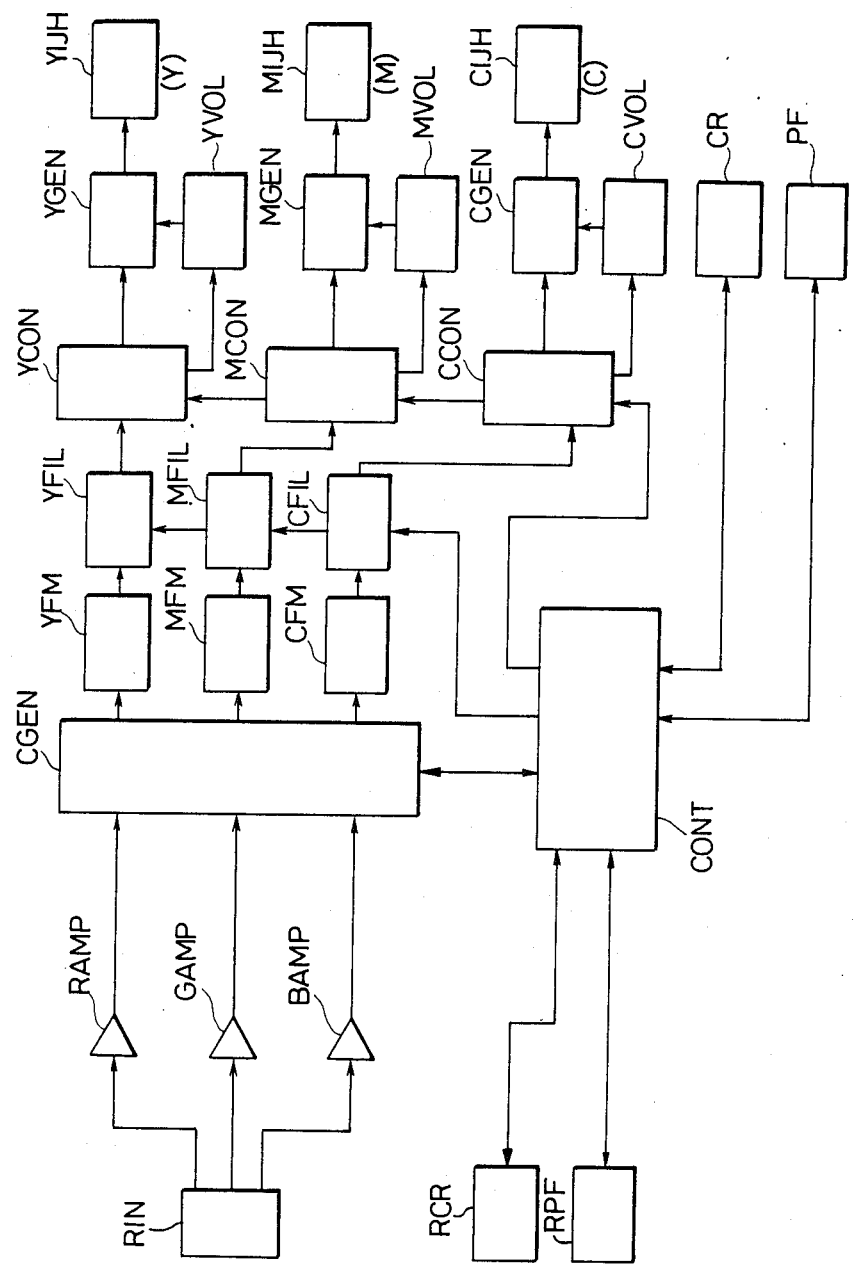

FIG. 15 is a block diagram of an eleventh embodiment of the present invention, when applied for a color printing device for color printing with the use of the three colors of yellow, magenta and cyan according to the on-demand ink jet system provided with a reading section for reading original images.

By the controlling signal from the controller CONT, the main reading scanning controlling section RCR and the subsidiary reading scanning controlling section RPF are controlled, whereby the reading portion RIN scans over the original images to give the gradation signals of the original images. Subsequent treatments of the gradation signals are the same as in the embodiment shown in FIG. 12. The same symbols also correspond to those shown in FIG. 10.

Figure 16:
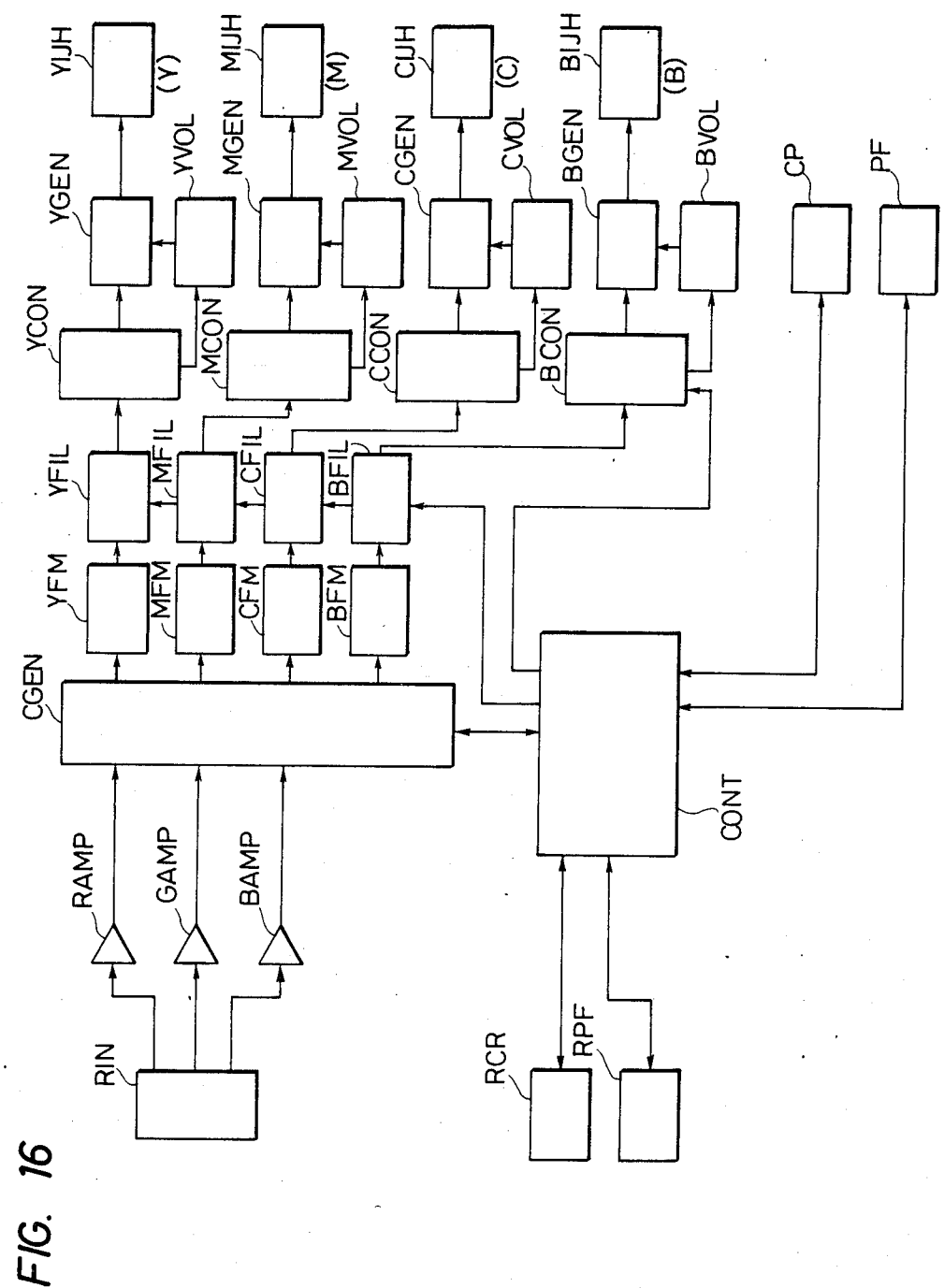

FIG. 16 is a block diagram of a twelfth embodiment of the present invention, when applied for a color printing device for color printing with the use of the four colors of yellow, magenta, cyan and black according to the on-demand ink jet system provided with a reading section RIN for reading original images.

By the controlling signal from the controller CONT, the main reading scanning controlling section RCR and the subsidiary reading scanning controlling section RPF are controlled, whereby the reading portion RIN scans over the original images to give the gradation signals of the original images. Subsequent treatments of the gradation signals are the same as in the embodiment shown in FIG. 13. The same symbols also correspond to those shown in FIG. 13.

In the present invention, in addition to modulation of the arrangement pitch or area of the image forming elements or both thereof, there may be employed a plural number of image forming elements with different optical densities, whereby the gradation region can be expressed continuously over a wide range from the highlighted portion to the dark portion, as illustrated, for example, in FIGS. 17 through 20.

Figure 17:
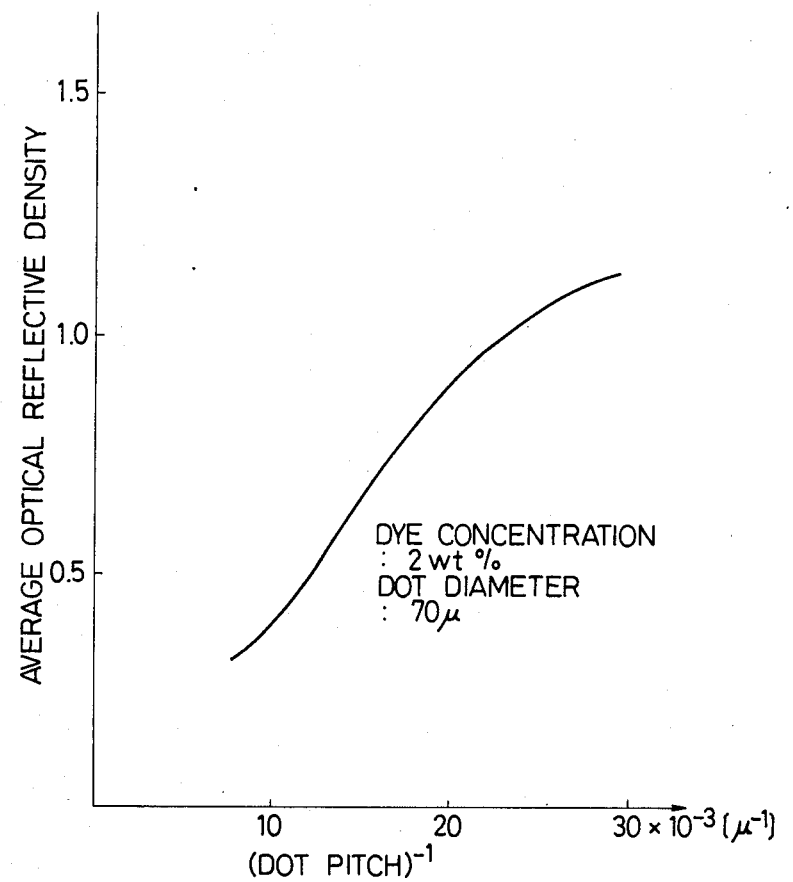
FIGS. 17 through 22 show the relations between the dot arrangement pitches and the optical average reflective densities.
Figure 18:
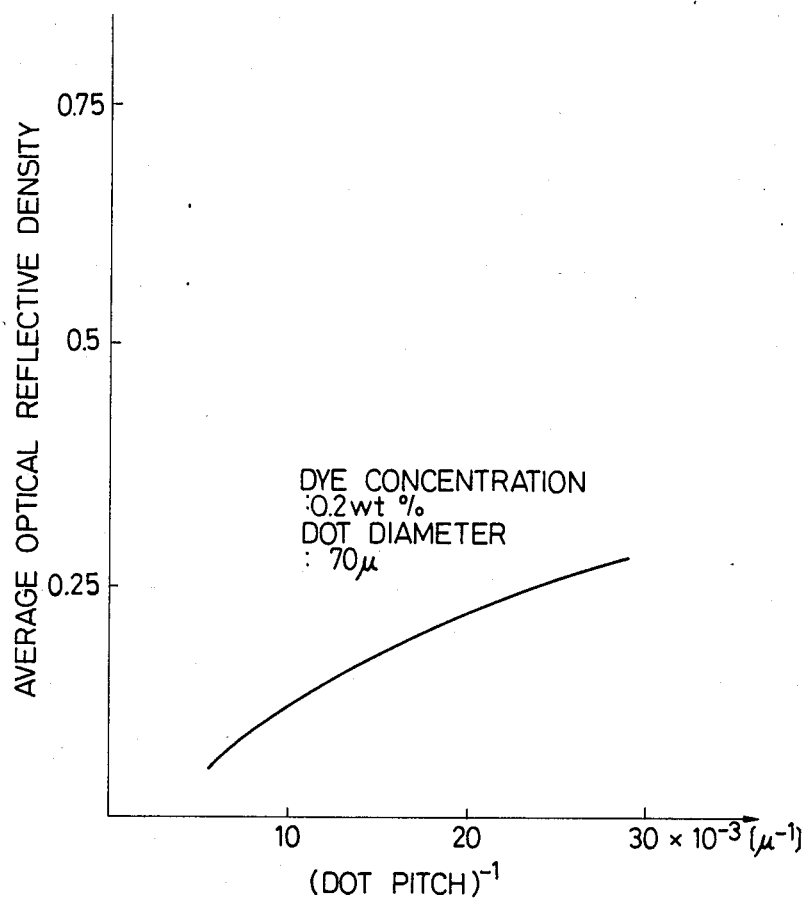

In FIGS. 17 and 18, there are shown the relationships between the dot pitch and the average optical reflective density, when dots of 70 $\mu$ in diameter are formed with arrangement pitches continuously varied on a paper according to the drop-on-demand system ink jet recording method by use of inks A and B, containing 2 wt. % and 0.2 wt. % of a dye, respectively. In FIGS. 17 and 18, the scale on the axis of abscissa is indicated in terms of the reciprocal number of dot pitch.

Figure 19:
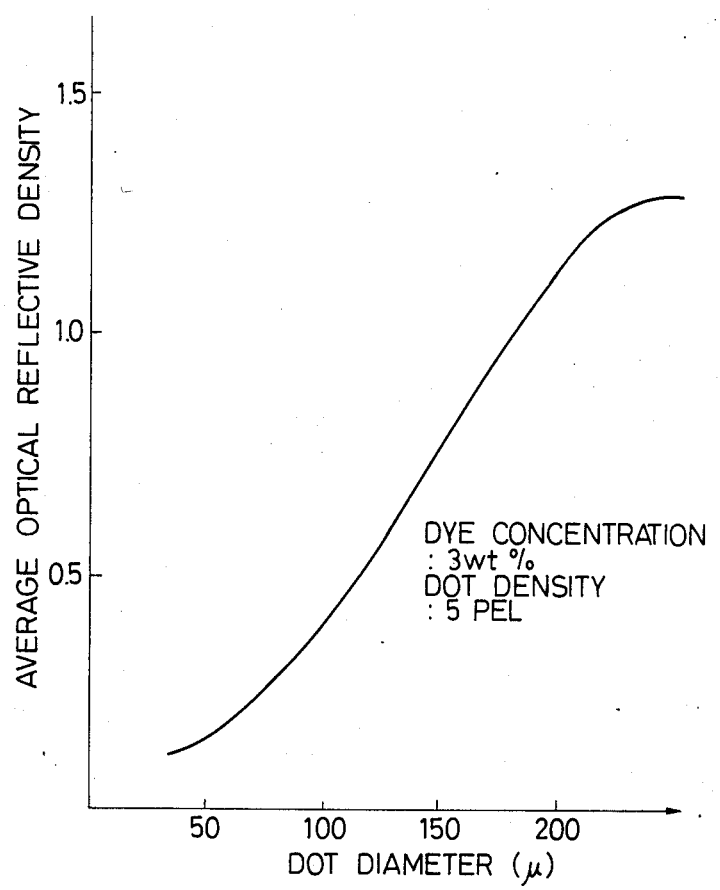
Figure 20:
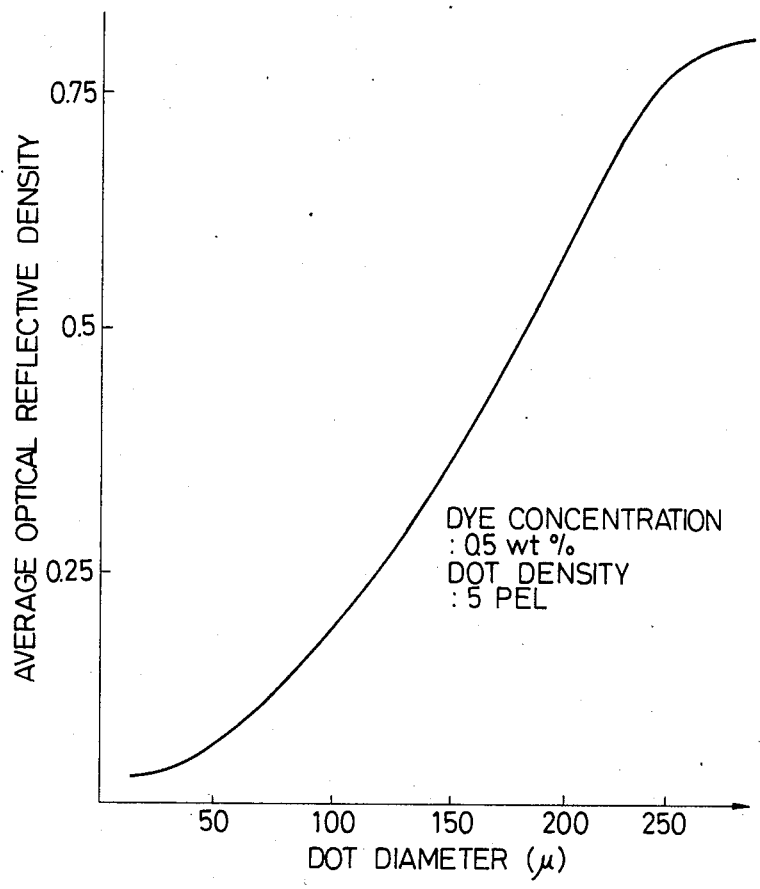

In FIGS. 19 and 20, there are shown the relationships between the dot diameters and the average optical reflective densities, when dot arrangements are formed on a paper with a dot density of 5 PEL (5 dots/1 mm) with modulation of dot diameter according to the drop-on-demand system ink jet recording method by use of inks C and D, containing 3 wt. % and 0.5 wt. % of a dye, respectively.

Figure 21:
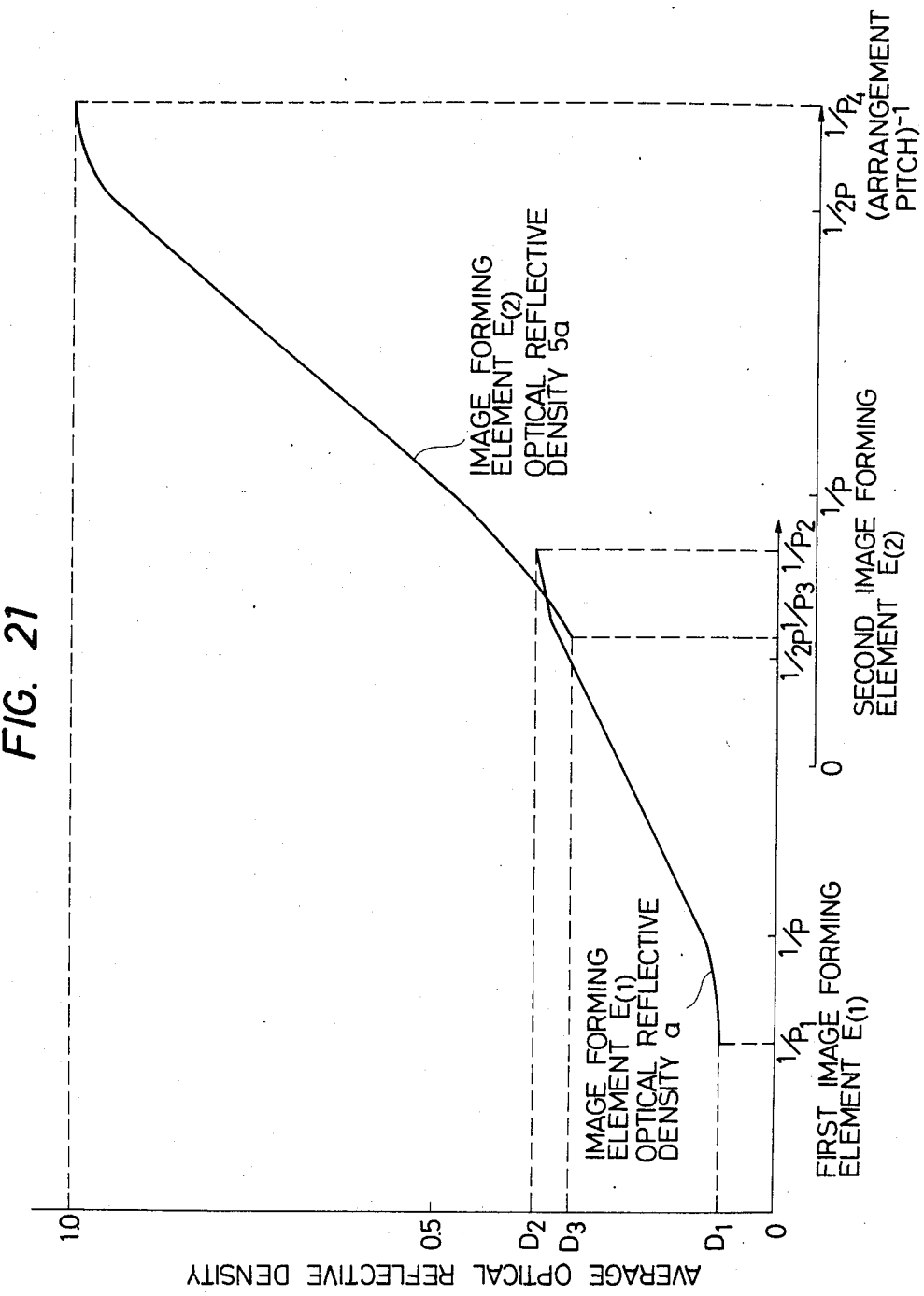

FIG. 21 shows an example of the relationship between the average optical reflective density and the arrangement pitch obtained by modulating the arrangement pitches of the two kinds of image forming elements E(1) and E(2) having two kinds of different optical reflective densities. The axis of the abscissa is indicated in terms of the reciprocal number of the arrangement pitch, and the average optical reflective density is indicated as a value normalized with the maximum level as being 1.

That is, in FIG. 21, by use of the image forming element E(1) (optical reflective density a) and the image forming element E(2) (optical reflective density 5a) having the same area S, the gradation characteristic can continuously be expressed in the region from the optical reflective density $D_1$ to $D_2$ by modulating continuously the arrangement pitch from $P_2$ to $P_1$ in the image forming element E(1), while the gradation characteristic can continuously be expressed in the region from the optical reflective density $D_3$ to 1.0 by modulating continuously the arrangement pitch from $P_4$ to $P_3$ in the image forming element E(2). Therefore, it is possible to express continuously the gradation at the levels in the region from the optical reflective density from $D_1$ to 1.0 by varying continuously the arrangement pitches by use of both image forming elements.

Figure 22:
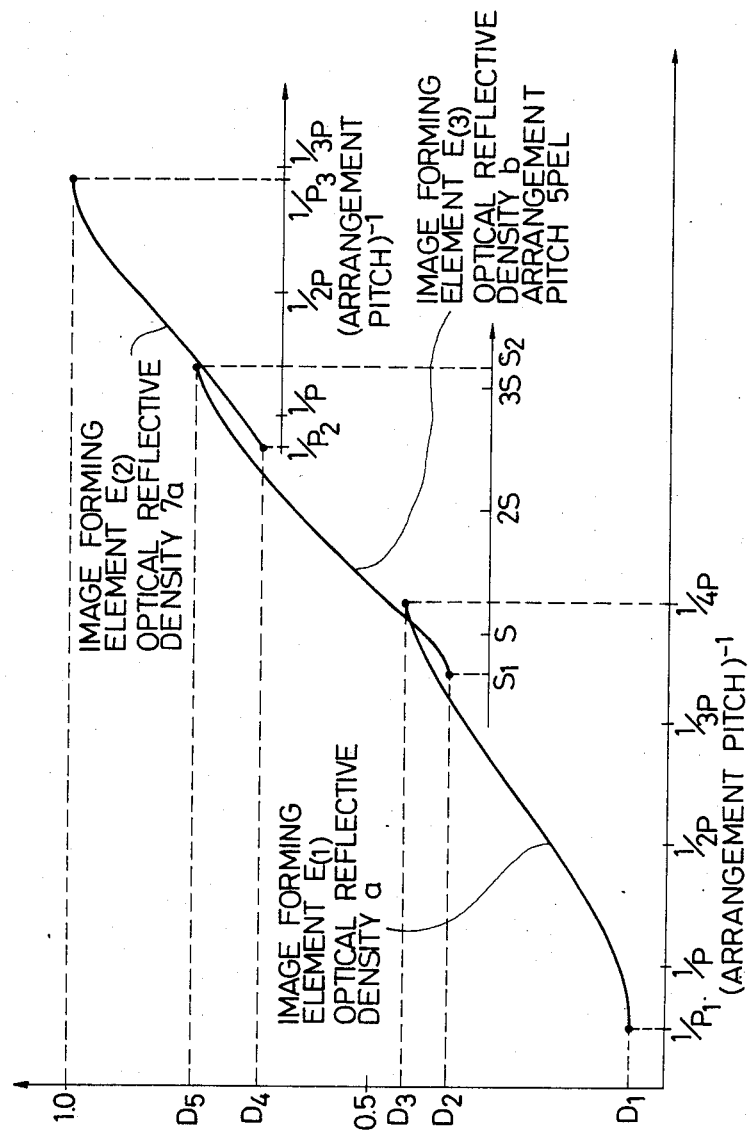

FIG. 22 shows an example of the relationship between the average optical reflective density and the arrangement pitch and area obtained by modulating the arrangement pitches and areas of the three kinds of image forming elements E(1), E(2) and E(3) having different optical reflective densities. The axis of the abscissa is indicated in terms of the reciprocal number of the arrangement pitch and area, and the average optical reflective density indicated as the value normalized with the maximum level as being 1.

That is, in FIG. 22, by use of the image forming element E(1) (optical reflective density a) and the image forming element E(2) (optical reflective density 7a) having the same area of S, the gradation characteristic can continuously be expressed in the region from the optical reflective density $D_1$ to $D_3$ by modulating continuously the arrangement pitch from 4P to $P_1$ in the image forming element E(1), the gradation characteristic can continuously be expressed in the region from the optical reflective density $D_4$ to 1.0 by modulating continuously the arrangement pitch from $P_3$ to $P_2$ in the image forming element E(2), and the expression of the gradation region from the optical reflective density $D_2$ to $D_5$ can be easily done by modulating its area from $S_1$ to $S_2$ in the image forming element E(3).

In the above explanations with reference to FIG. 21 and FIG. 22, there are shown the cases in which two kinds or three kinds of image forming elements with different optical densities have been used, to which, however, the present invention is not limited, but four or more kinds of image forming elements with different optical densities may be employed. With an increase in the kinds of the image forming elements with different optical densities, the gradation characteristic over a wide range can be expressed with higher degree of fineness of texture.

Also, in the image forming method of the present invention, even when the image forming elements with different optical densities employed may be two kinds, it is also possible to express continuously the gradation region over a sufficiently wide region by combination of two kinds of modulation factors of the arrangement pitch and area.

For example, by use of the two kinds of the image forming element E(1) with an optical density of $D_1$ and the image forming element E(2) with an optical density of $D_2$ (provided $D_1 \neq D_2$), the desired gradation characteristic may be expressed by (1) carrying out the gradation expression with the image forming element E(1) by performing both of the arrangement modulation and the area modulation successively or simultaneously and carrying out the gradation expression by performing either one of the arrangement modulation and the area modulation, or (2) carrying out the gradation expression with both of the image forming elements E(1) and E(2) by performing both of the arrangement modulation and the area modulation successively or simultaneously.

The gradation expressing methods according to such combinations of the kinds of the image forming elements E and the modulation factors are listed in Table 1, in the case when two kinds of image forming elements E are employed.

TABLE 1

| modulating factor | image forming element | | | |
|---|---|---|---|---|
| | E(1) | | E(2) | |
| | arrangement pitch | area | arrangement pitch | area |
| gradation expressing method | | | | |
| (A) | o | o | o | — |
| (B) | o | o | — | o |
| (C) | o | o | o | o |
| (D) | o | — | o | o |
| (E) | — | o | o | o |
| (F) | o | — | — | o |
| (G) | — | o | o | — |
| (H) | o | o | — | — |
| (I) | — | — | o | o |

In Table 1, when one kind of image forming elements has two modulation factors, those modulation factors may be modulated separately from region to region in the expression region of gradation, or alternatively they may be modulated simultaneously regardless of distinction with respect to the expression region.

In Table 1, the combinations modulated neither by arrangement pitch nor by area may be expressed in gradation by modulating with other factors than these factors, for example, by varying the number of the image forming elements occupying one image element (number modulation).

In the embodiments as illustrated below, a plural number of image forming elements with different optical densities have been employed in the image forming method according to the present invention as described above with reference to FIG. 1 and FIG. 2.

Figure 23:
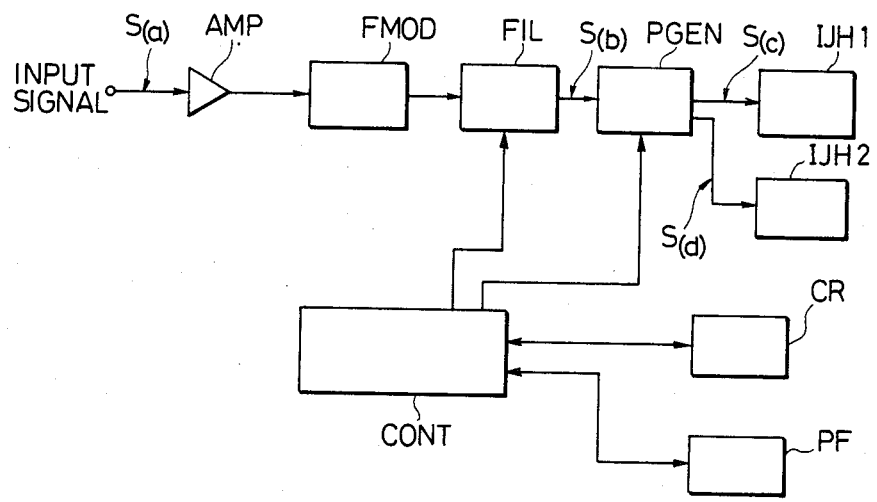

FIG. 23 shows a block diagram, when applied for a monochromatic printer of the on-demand type ink jet system.

The input signal having a gradation such as of a video signal is amplified by an amplifier AMP and inputted into the frequency modulating section FMOD. The gradation signal is modulated in frequency by the frequency modulating section FMOD and inputted as the signal S(c) into the filter section FIL. At the filter portion FIL, the frequency component exceeding the maximum response frequency of the ink jet head is cut by controlling of the controller CONT, and the residual component is inputted into the image pulse generating section PGEN. The signal inputted into the image pulse generating section PGEN generates the driving signals for the ink jet head IJH 1 for dark ink and the ink (sometimes referred to herein as ink having a higher dye concentration) jet head IJH 2 for light ink (sometimes referred to herein as ink having a lower dye concentration), respectively, with the threshold value given by the controller CONT as the standard. By these driving signals, the ink jet head IJH 1 and IJH 2 repeat on-off actuations, whereby ink liquids are discharged per said repeated actuations to form flying ink droplets. Synchronized with discharging of ink liquids, the controller CONT outputs controlling signals toward the carriage controlling section CR and to the paper feeding controlling section PF, respectively, according to which signals the ink jet head IJH 1 and IJH 2 are scanned on a recording paper.

Figure 24:
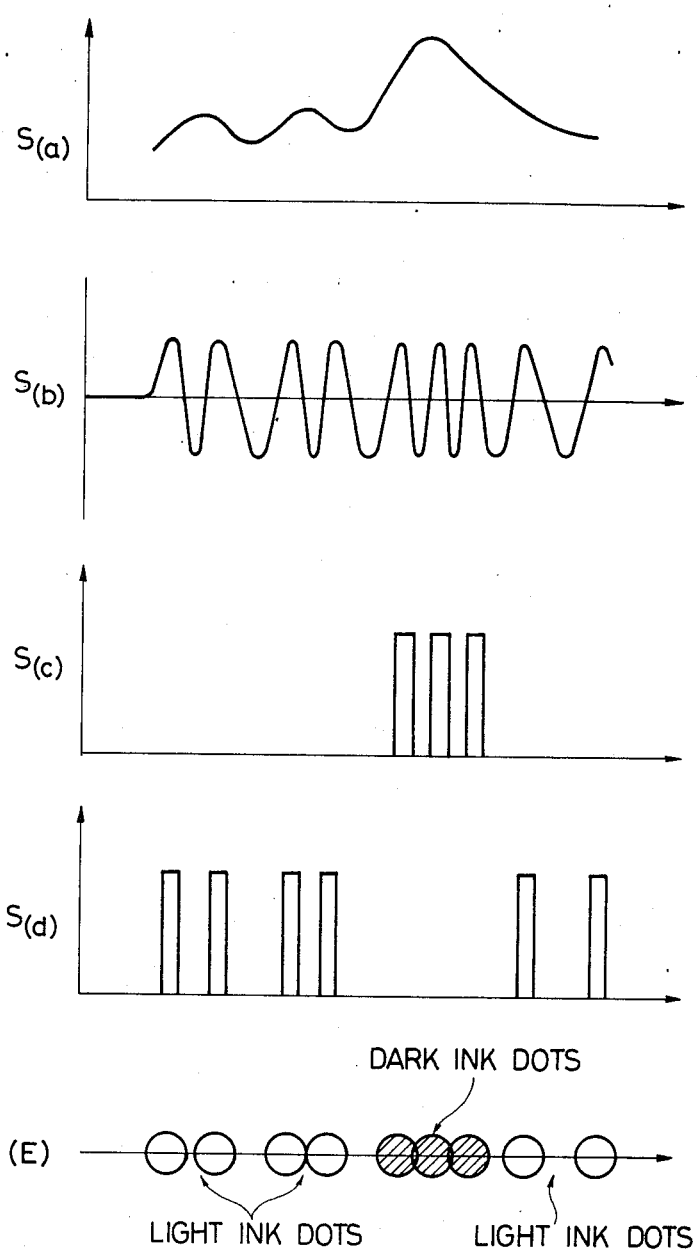

FIG. 24 shows an example of signals at respective sections in a thirteenth embodiment shown in FIG. 23. In FIG. 24, (E) shows an example of the arrangement state of dots, in which the pitches between dots are modulated corresponding to the gradation levels, and the dark portion is expressed by arrangement of dots formed with dark ink.

Figure 25:
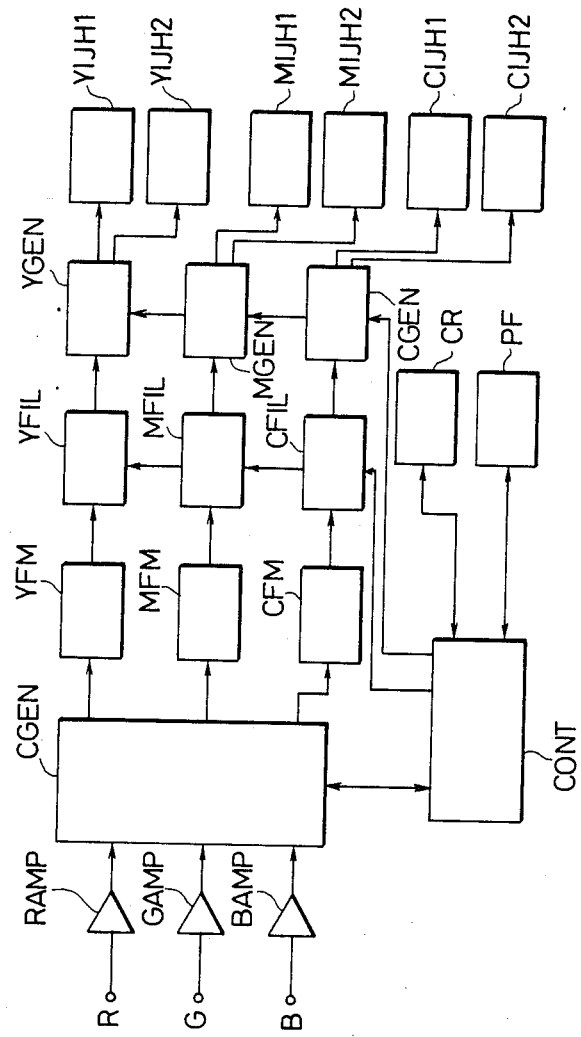

FIG. 25 is a block diagram of a fourteenth embodiment of the present invention, when applied for a color printer for printing images with the use of inks of the three colors of yellow, magenta and cyan according to the on-demand ink jet system.

First, the three color input signals of red (R), green (G) and blue (B) are amplified by the amplifiers RAMP, GAMP and BAMP, respectively, and inputted into the color signal generating section CGEN. The color signals inputted into the color signal generating section CGEN are applied with the signal treatments under the control by the controller CONT and outputted from the color signal generating section CGEN to be inputted into the frequency modulating sections YFM, MFM and CFM, respectively. The respective modulated signals modulated at the frequency modulating sections YFM, MFM and CFM are inputted into the filter sections YFIL, MFIL and CFIL, respectively. The modulated respective color signals are subjected to cutting of the frequency components exceeding the maximum response of the ink jet heads based on the controlling signals outputted from the controller CONT in YFIL, MFIL and CFIL and then inputted to the image forming pulse generating sections YGEN, MGEN and CGEN, respectively. The signals inputted into the respective pulse generating sections YGEN, MGEN and CGEN form driving signals for the ink jet heads YIJH 1, YIJH 2, MIJH 1, MIJH 2, CIJH 1 and CIJH 2 for dark and light inks of respective colors with the threshold values given by the controller CONT as the standards, respectively. By the driving signals, the respective ink jet heads repeat on-off actuations to discharge ink liquids per said actuations, thereby forming flying ink droplets. Synchronized with discharging of the ink liquid, the controller CONT outputs controlling signals to the carriage controlling section CR and the paper feeding controlling section PF, whereby the respective ink jet heads scan over the recording paper. In this embodiment, the switching point between the dark and light inks is set at the same optical reflective density for each color.

Figure 26:
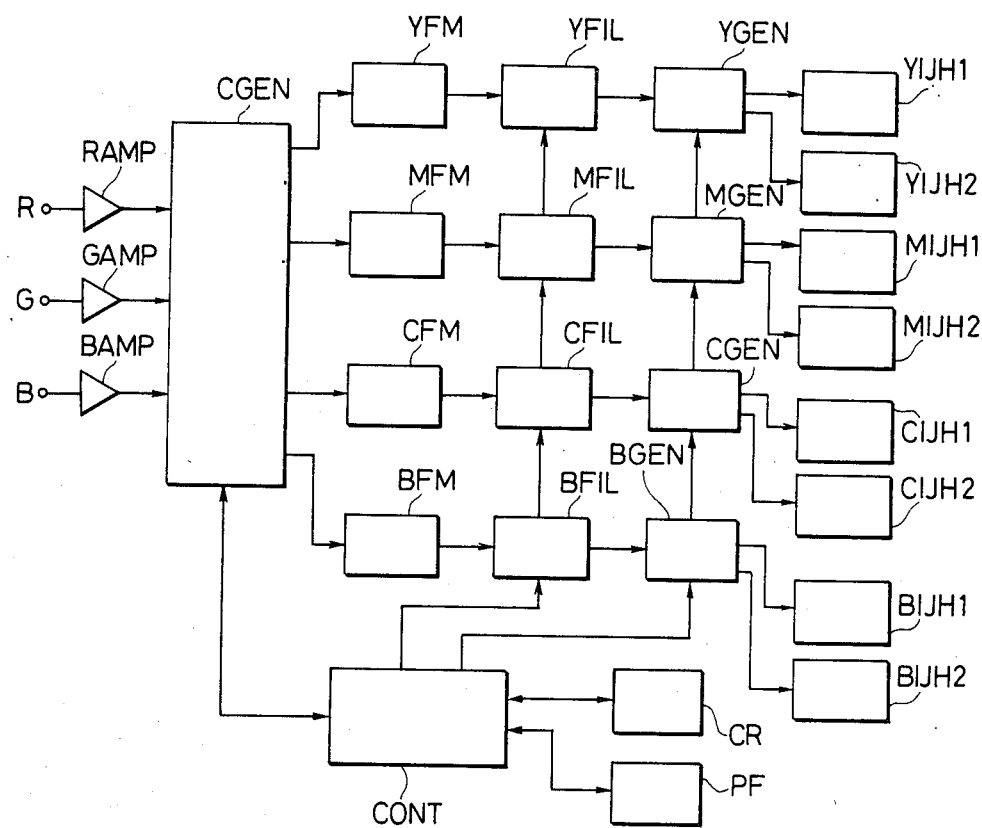

FIG. 26 is a block diagram of a fifteenth embodiment of the present invention, when applied for a color printer for printing images with the use of the four colors of yellow, magenta, cyan and black according to the on-demand ink jet system. In case of said embodiment, the content of basic signal treatment is the same as in the tri-color printer shown in FIG. 25, except for addition after the color signal generating circuit CGEN et seq of a black signal frequency modulating section BFM, a filter section for black signal BFIL, a pulse generating section for black signal BGEN and an ink jet head for black signal BIJH 1, and BIJH 2. Also, the same symbols employed correspond to those in FIG. 25.

Figure 27:
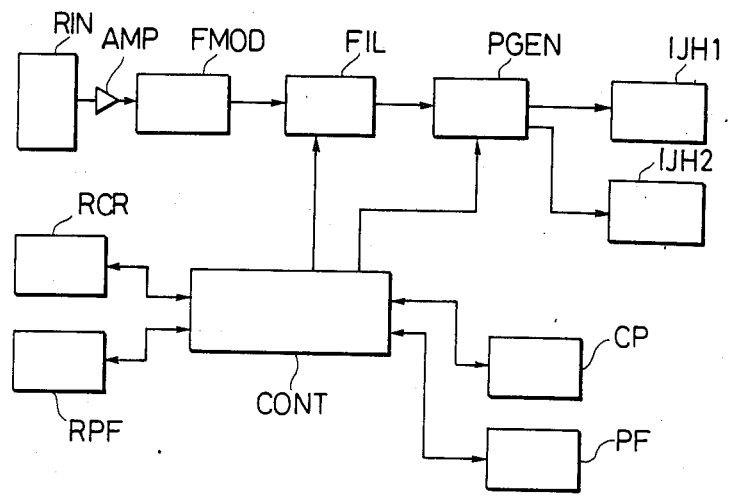

FIG. 27 is a sixteenth embodiment of the present invention, when applied for a monochromatic ink jet printing device of the on-demand ink jet system provided with a reading section for reading original images. The controlling sighal from the controller CONT is inputted respectively into the main reading scanning controlling section RCR and the subsidiary reading scanning controlling section RPF, whereby the reading portion RIN scans over the original images to obtain the gradation signals to be inputted into the amplifier AMP. The treatments of the gradation signal inputted in the amplifier AMP et seq are the same as in the embodiment shown in FIG. 23, and the same symbols shown in this Figure correspond to those in FIG. 23.

Figure 28:
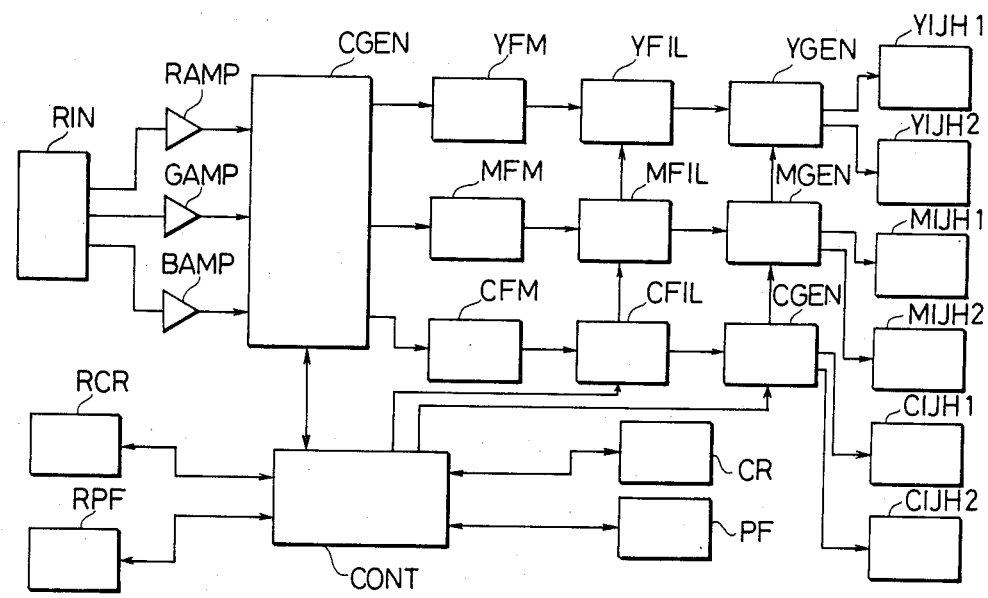

FIG. 28 is a block diagram of a seventeenth embodiment of the present invention, when applied for a color printing device for color printing with the use of the three colors of yellow, magenta and cyan according to the on-demand ink jet system provided with a reading section for reading original images. The controlling signal from the controller CONT is inputted respectively into the main reading scanning controlling section RCR and the subsidiary reading scanning controlling section RPF, whereby the reading portion RIN scans over the original images to give the gradation signals of R (red), G (green) and B (blue), respectively. The treatments of the gradation signals at the respective amplifiers RAMP, GAMP, MAMP et seq are the same as in the embodiment shown in FIG. 25. The same symbols also correspond to those shown in FIG. 25.

Figure 29:
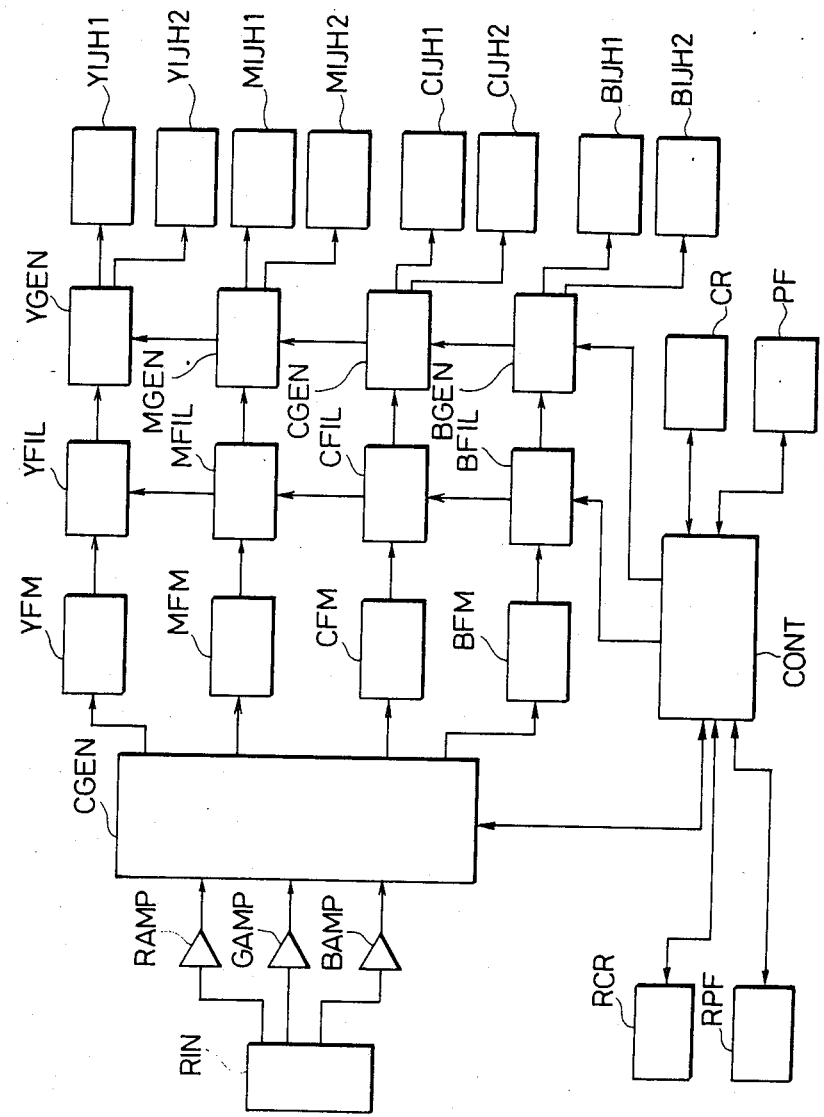

FIG. 29 is a eighteenth embodiment of the present invention, when applied for a color printing device for color printing with the use of the four colors of yellow, magenta, cyan and black according to the on-demand ink jet system provided with a reading section RIN for reading original images. The controlling signal from the controller CONT is inputted respectively into the main reading scanning controlling section RCR and the subsidiary reading scanning controlling section RPF, whereby the reading portion RIN scans over the original images to give the gradation signals of the three colors (R, G, B), respectively. The treatments of the gradation signals at the respective amplifiers RAMP, GAMP, BAMP et seq are the same as in the embodiment shown in FIG. 26. The same symbols also correspond to those shown in FIG. 26.

In the descriptions of the foregoing thirteenth to eighteenth embodiments, the boundary between the gradation expression with the dark ink and the light ink was set at the same optical density point for each color, but the present invention is not limited thereto, but the boundary may be set at the gradation levels different from each other.

Figure 30:
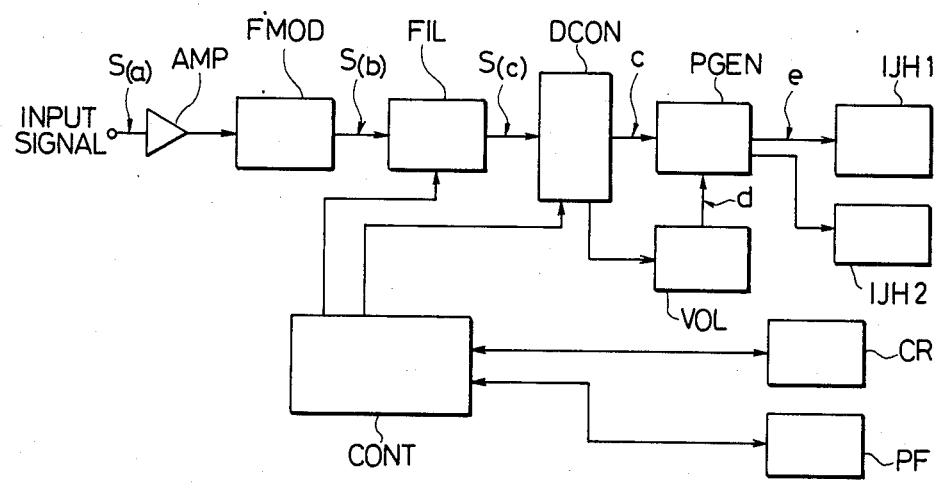

FIG. 30 is a block diagram of an embodiment of the method as illustrated with reference to FIG. 2, when applied for a monochromatic printer of the on-demand ink jet system in which a plural number of image forming elements with different optical densities are employed.

The input signal S(a) having a gradation characteristic such as of a video signal is inputted into the input terminal. The gradation signal S(a) is amplified by the amplifier AMP and inputted into the frequency modulating section FMOD. The amplified gradation signal S(b) is modulated in frequency by the frequency modulating section FMOD according to the gradation characteristic and inputted as the signal S(c) into the filter section FIL. The frequency modulated gradation signal S(c), after cutting of the frequency component exceeding the maximum response frequency of the ink jet head by controlling of the controller CONT in the filter section FIL, is then inputted into the dot pitch/diameter controlling section DCON. By the controlling signal outputted from the controller CONT corresponding to the signal S(c) inputted into the section DCON for controlling dot pitch and diameter, an applied head voltage is obtained according to the gradation characteristic and at the same time dot pitches are given with the density threshold value given by the controller CONT as the standard. The voltage signal to be applied on ink jet head IJH outputted from the dot pitch/diameter controlling section DCON is inputted into the head driving voltage controlling section VOL to set the head driving voltage, which is then supplied to the image forming pulse generating section PGEN. At the image forming pulse generating section PGEN, the current from the head driving voltage controlling section VOL is switched by the pulse signal from the controller DCON, thereby forming the driving pulses for driving the ink jet heads IJH 1 and IJH 2. By the driving pulses, the ink jet heads IJH 1 and IJH 2 repeat on-off actuations to form flying ink droplets. Synchronized with discharging of ink liquids, the controller CONT supplies controlling signals to the carriage controlling section CR and to the paper feeding controlling section PF, respectively, according to which signals the ink jet heads scan a recording paper.

Figure 31:
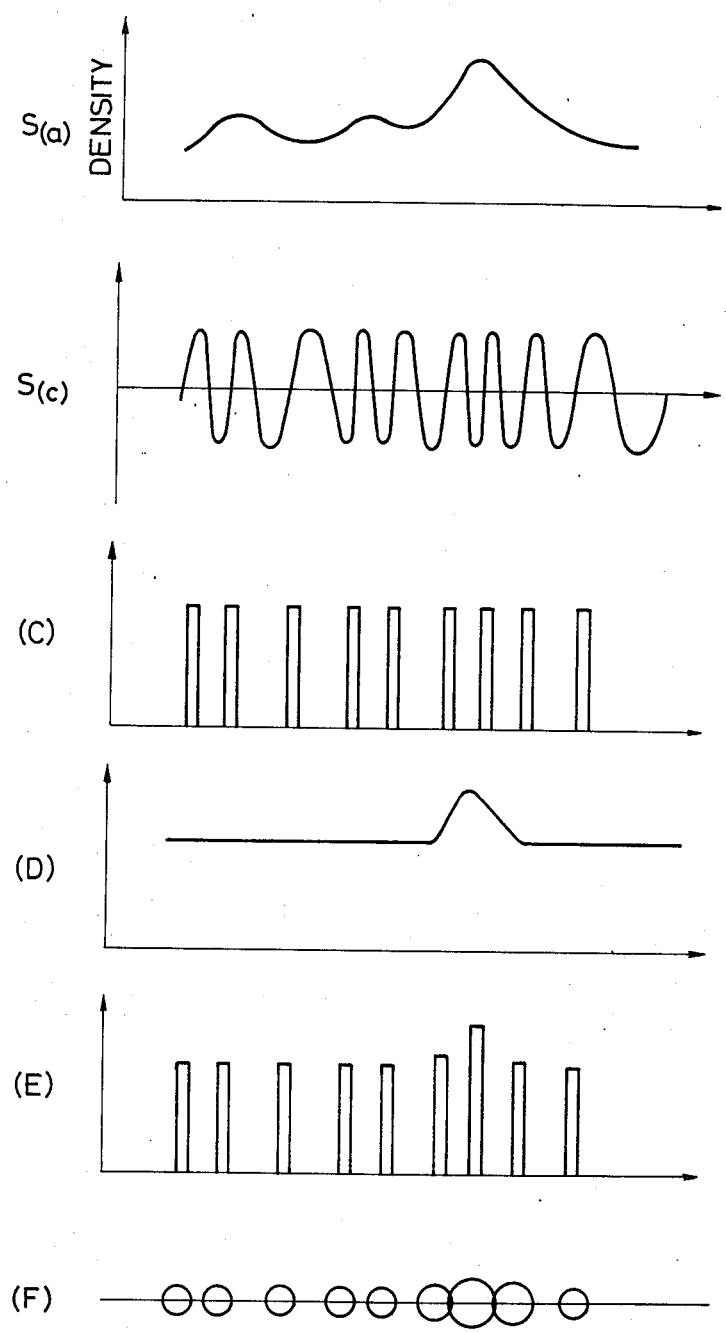

FIG. 31 shows an example of signals at respective sections in a ninteenth embodiment of the present invention. (C) is the timing pulse for forming the driving pulse for the dark ink nozzle and the applied head voltage is given by (D). By the above timing pulse (C) and the head application voltage (D), there is formed the ink jet head driving pulse (E), through which driving pulse (E) is actuated on-off driving of the ink jet head IJH repeatedly to arrange the image forming elements as shown by (F). The pitches between the dots and the dot diameters are varied as shown in (F) corresponding to the gradation levels, and there is some region at the dark portion in which dots are overlapped with each other. With regard to the signal for driving an ink jet head for light ink, the same explanation as above may be applied.

Figure 32:
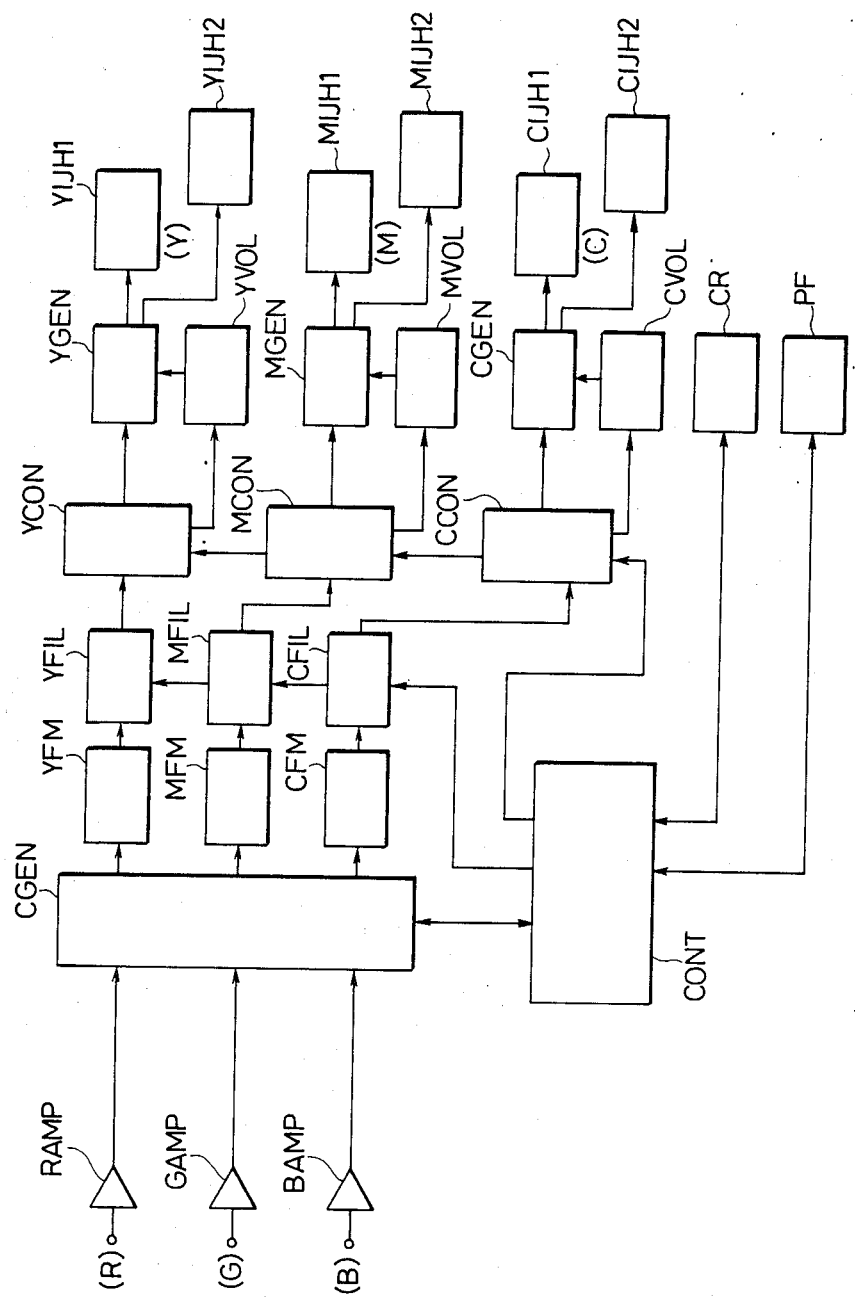

FIG. 32 is a block diagram of a twentieth embodiment of the present invention, when applied for a color printer for printing images with the use of inks of the three colors of yellow, magenta and cyan according to the on-demand ink jet system.

First, a color video signal or color signals of red (R), green (G) and blue (B) are amplified by the amplifiers RAMP, GAMP and BAMP, respectively, and inputted into the color signal generating section CGEN. On the inputted signals, the controller CONT applies image treatments to output the output signals corresponding to the respective input signals. The output signals are inputted into the frequency modulating sections YFM, MFM and CFM, respectively. In the frequency modulating sections YFM, MFM and CFM, the input signals of the respective corresponding colors are modulated in frequency, and their output signals are inputted into the filters YFIL, MFIL and CFIL, respectively. The signals of the respective colors modulated in frequency in filters YFIL, MFIL and CFIL are subjected to cutting of the frequency modulated components exceeding the maximum response of the respective ink jet heads by the controller CONT and then inputted to the dot pitch/diameter controlling sections YCON, MCON and CCON, respectively. From the signals inputted into the dot pitch/diameter controlling sections YCON, MCON and CCON, are obtained the dot timing signals and the head application voltage signals corresponding to the gradation changes.

The dot timing signals are inputted into the image forming pulse generating sections YGEN, MGEN and CGEN, respectively. On the other hand, the head driving voltage signals are inputted into the head driving voltage controlling sections YVOL, MVOL and CVOL, respectively, to set the voltage values of the driving signals to be applied on corresponding heads.

At the image forming pulse generating sections of YGEN, MGEN and CGEN, switching of the signal currents from the head voltage controlling sections YVOL, MVOL and CVOL is effected by the input signals from the dot pitch/diameter controlling sections YCON, MCON and CCON, thereby forming the driving pulses for the ink jet heads YIJH 1, YIJH 2, MIJH 1, MIJH 2, CIJH 1, CIJH 2. By the driving pulses, the respective ink jet heads YIJH 1, YIJH 2, MIJH 1, MIJH 2, CIJH 1, CIJH 2 repeat on-off actuations thereby to form flying ink droplets per said actuations. Synchronized with discharging of the ink liquid, the controller CONT outputs controlling signals to the carriage controlling section CR and the paper feeding controlling section PF, whereby the respective ink jet heads scan over the recording paper.

Figure 33:
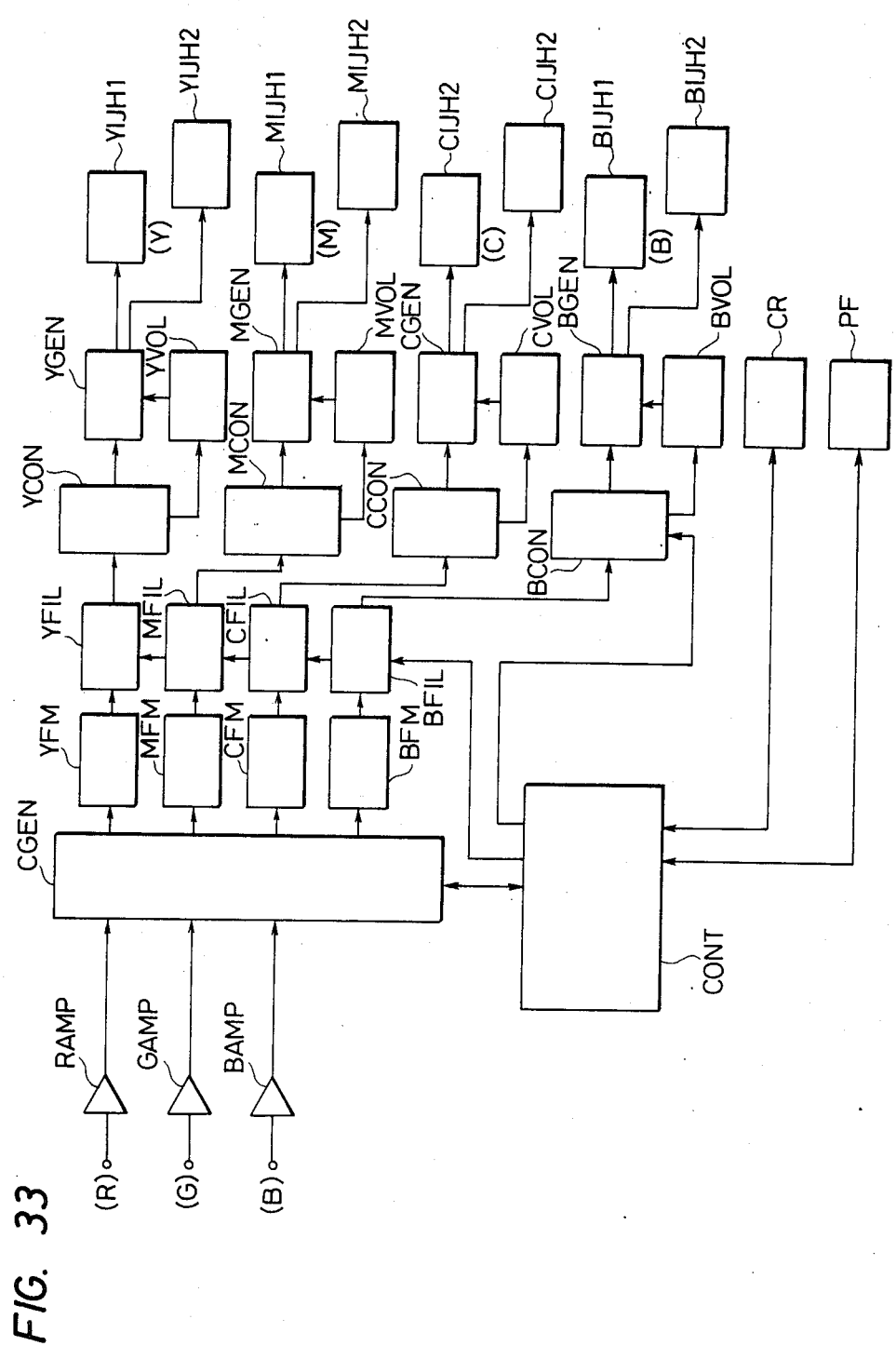

FIG. 33 is a block diagram of a twenty-first embodiment of the present invention, when applied for a color printer for printing images with the use of the four colors of yellow, magenta, cyan and black according to the on-demand ink jet system. The circuit block is the same in basic contents of signal treatment as the tricolor printer shown in FIG. 32, except for addition of the circuit portions for treating signals for black ink, namely a modulating section BFM, a filter section BFIL, a dot pitch/diameter controlling section BCON, a head voltage controlling section BVOL, an image forming pulse generating section BGEN and ink jet heads BIJH 1 and BIJH 2. The same symbols employed also correspond to those in FIG. 32.

Figure 34:
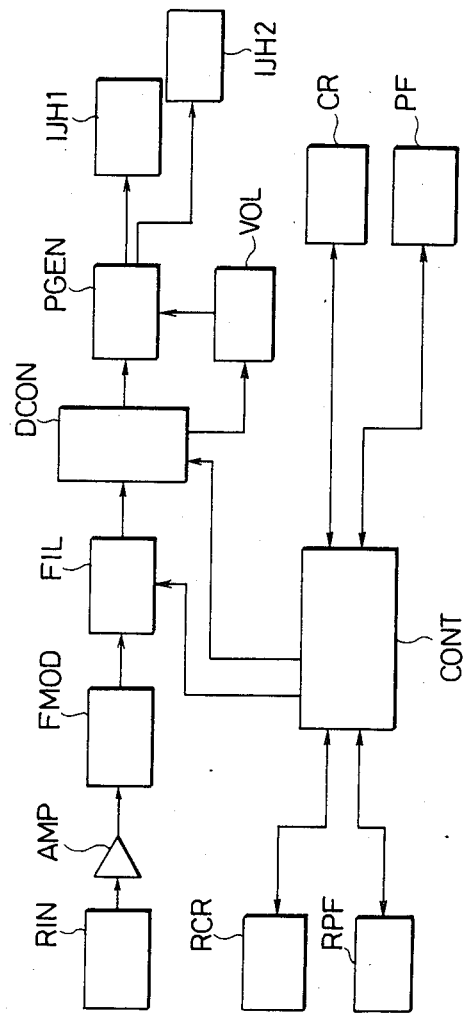

FIG. 34 is a block diagram of a twenty-second embodiment of the present invention, when applied for a monochromatic ink jet printing device of the on-demand ink jet system provided with a reading section for reading original images.

By the controlling signal from the controller CONT, the main reading scanning controlling section RCR and the subsidiary reading scanning controlling section RPF are controlled, whereby the reading portion RIN scans over the original images to obtain the gradation signals. Subsequent treatments of the gradation signals are the same as in the embodiment shown in FIG. 30, and the same symbols shown in this Figure correspond to those in FIG. 30.

Figure 35:
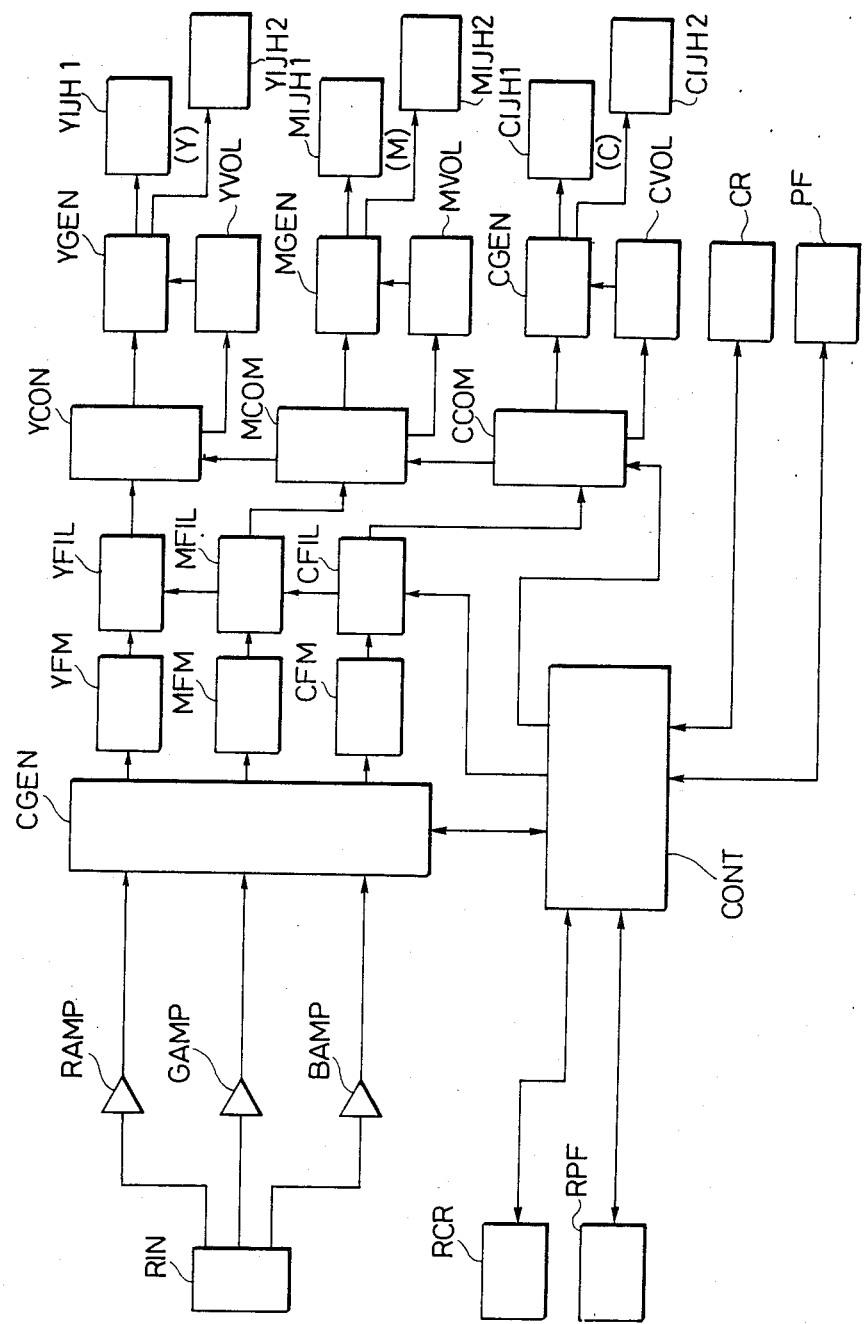

FIG. 35 is a block diagram of a twenty-third embodiment of the present invention, when applied for a color printing device for color printing with the use of the three colors of yellow, magenta and cyan according to the on-demand ink jet system provided with a reading section for reading original images.

By the controlling signal from the controller CONT, the main reading scanning controlling section RCR and the subsidiary reading scanning controlling section RPF are controlled, whereby the reading portion RIN scans over the original images to give the gradation signals of the original images. Subsequent treatments of the gradation signals are the same as in the embodiment shown in FIG. 32. The same symbols also correspond to those shown in FIG. 32.

Figure 36:
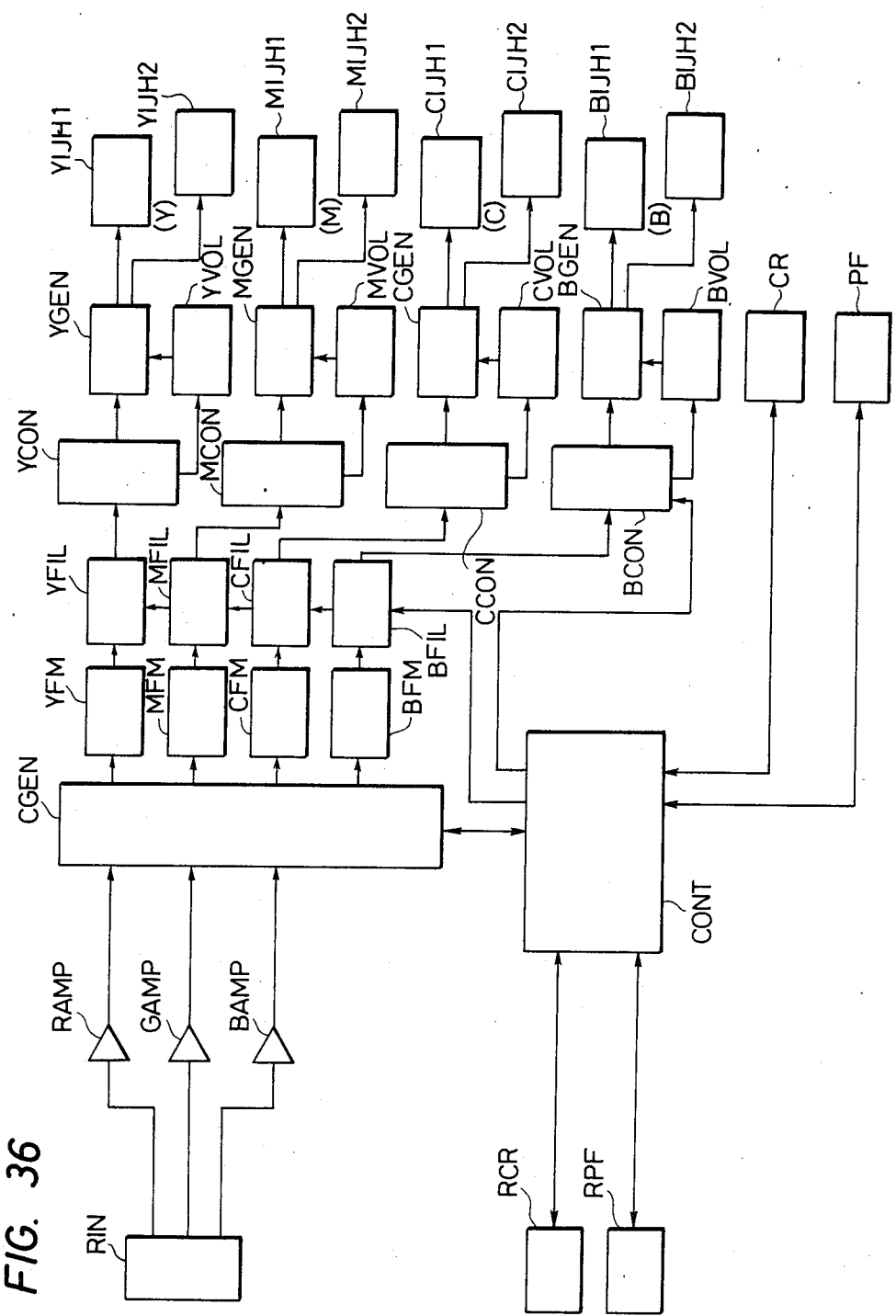

FIG. 36 is a block diagram of a twenty-fourth embodiment of the present invention, when applied for a color printing device for color printing with the use of the four colors of yellow, magenta, cyan and black according to the on-demand ink jet system provided with a reading section RIN for reading original images.

By the controlling signal from the controller CONT, the main reading scanning controlling section RCR and the subsidiary reading scanning controlling section RPF are controlled, whereby the reading portion RIN scans over the original images to give the gradation signals of the original images. The treatments at the respective amplifiers et seq are the same as in the embodiment shown in FIG. 33. The same symbols also correspond to those in FIG. 33.

In the above descriptions, as the ink jet head, the on-demand type ink jet system has been employed, but the present invention is not thereto, but it can also be applied for other printers such as heat-transfer type printer, wire dot printers, electrophotographic printers, etc.

As described in detail above, according to the image forming method, it is possible to express easily images with natural tone of high quality which are free from the feeling of "graininess" or "roughnesss" and also free from the feeling of "glittering" at the highlighted portion, namely without stimulation to the eyes.

Also, since gradation can be expressed with fine texture over a wide range of expression region, there can be obtained images excellent in naturalness.

Further, the images obtained according to the image forming method according to the present invention are also excellent in sharpness and resolution.

In addition, in reproduction of the highlighted portion and the skin portion of a person, the half tone over a wide range can be expressed smoothly and continuously without losing naturalness.

Moreover, even in expression of a full color image, there can be obtained a sufficiently natural image of high quality.

We claim:

1. A method of forming on a medium an image with areas having different light-reflecting properties providing different optical reflection densities, the method comprising:
   providing on the medium a plurality of image forming elements, at least one color of which is provided in different concentrations, with different pitches therebetween in different areas of the image; and
   selecting the concentrations of said image forming elements and the pitch thereof in accordance with the optical reflection densities of respective areas of the image to be formed, wherein the pitches of higher concentration image forming elements are greater than the pitches of lower concentration image forming elements.

2. A method according to claim 1, wherein the image forming elements are ink dots formed by inks having different dye concentrations.

3. A method according to claim 1, wherein said image forming elements are provided in a plurality of colors and in a plurality of concentrations for each color.

4. A method according to claim 3, wherein one of the colors of the image forming elements are black.

5. A method according to claim 3, wherein the colors of the image forming elements are selected from the group consisting of cyan, magenta, yellow, red, green, blue and black.

6. A method of forming on a medium an image with areas having different light-reflecting properties providing different optical reflection densities, the method comprising:
   providing on the medium a plurality of image forming elements, at least one color of which is provided in different concentrations, with different areas and different pitches therebetween in different areas of the image; and
   selecting the concentrations and areas of said image forming elements and the pitch thereof in accordance with the optical reflection densities of respective areas of the image to be formed, wherein the pitches of higher concentration image forming elements are greater than the pitches of lower concentration image forming elements.

7. A method according to claim 6, wherein the image forming elements are ink dots formed by inks having different dye concentrations.

8. A method according to claim 6, wherein said image forming elements are provided in a plurality of colors and a plurality of concentrations for each color.

9. A method according to claim 8, wherein one of the colors of the image forming elements are black.

10. A method according to claim 8, wherein the colors of the image forming elements are selected from the group consisting of cyan, magenta, yellow, red, green, blue and black.

* * * * *

UNITED STATES PATENT AND TRADEMARK OFFICE
CERTIFICATE OF CORRECTION

PATENT NO. : 4,692,773  Page 1 of 3
DATED : September 8, 1987
INVENTOR(S) : ASAO SAITO, ET AL.

It is certified that error appears in the above-identified patent and that said Letters Patent is hereby corrected as shown below:

AT [57] IN THE ABSTRACT

Line 5, "direction without quantization" should read --direction, without quantization,--.

IN THE DRAWINGS

Sheet 11, Fig. 13, "RAMP" (designating amplifier for green (G) signal) should read --GAMP--.

COLUMN 1

Line 27, "such" should read --(such--.
Line 32, "of plural" should read --of a plural--.
Line 34, "as" should read --a--.

COLUMN 2

Line 58, "loss naturalness" should read --loss of naturalness--.

COLUMN 3

Line 16, "graininess" should read --"graininess"--.

COLUMN 4

Line 18, "illustration" should read --an illustration--.
Line 24, "a" (first occurrence) should read --an--.
Line 30, "a" (second occurrence) should read --an--.
Line 42, "now the" should read --now to the--.
Line 55, "$H_2H_3$" should read --$H_2$, $H_3$--.

UNITED STATES PATENT AND TRADEMARK OFFICE
CERTIFICATE OF CORRECTION

PATENT NO. : 4,692,773
DATED : September 8, 1987
INVENTOR(S) : ASAO SAITO, ET AL.

It is certified that error appears in the above-identified patent and that said Letters Patent is hereby corrected as shown below:

COLUMN 7

Line 51, "repeates" should read --repeats--.

COLUMN 8

Line 5, "user" should read --use--.
    Line 17, "CMF" should read --CFM--.

COLUMN 9

Line 8, "MAMP)" should read --BAMP)--.
    Line 61, "repeates" should read --repeats--.

COLUMN 13

Line 18, delete "of".

COLUMN 14

Line 50, delete "and the ink".
    Line 52, "jet" should read --and the ink jet--.

COLUMN 16

Line 17, "MAMP" should read --BAMP--.
    Line 20, "a" should read --an--.

COLUMN 17

Line 20, "ninteenth" should read --nineteenth--.

UNITED STATES PATENT AND TRADEMARK OFFICE
CERTIFICATE OF CORRECTION

PATENT NO. : 4,692,773

DATED : September 8, 1987

INVENTOR(S) : ASAO SAITO, ET AL.

It is certified that error appears in the above-identified patent and that said Letters Patent is hereby corrected as shown below:

COLUMN 19

Line 12, "not thereto," should read --not limited thereto,--.

COLUMN 20

Line 13, "are" should read --is--.
    Line 41, "are" should read --is--.

Signed and Sealed this

Fifteenth Day of March, 1988

Attest:

DONALD J. QUIGG

*Attesting Officer*      *Commissioner of Patents and Trademarks*